United States Patent
Hayashi et al.

[11] Patent Number: 6,153,296
[45] Date of Patent: Nov. 28, 2000

[54] ACICULAR HEMATITE PARTICLES AND MAGNETIC RECORDING MEDIUM

[75] Inventors: Kazuyuki Hayashi; Keisuke Iwasaki, both of Hiroshima; Tosiharu Harada, Ube; Hiroko Morii, Hiroshima, all of Japan

[73] Assignee: Toda Kogyo Corporation, Hiroshima-ken, Japan

[21] Appl. No.: 09/266,018

[22] Filed: Mar. 11, 1999

[30] Foreign Application Priority Data

Mar. 13, 1998 [JP] Japan .................................. 10-082487
Mar. 18, 1998 [JP] Japan .................................. 10-089386

[51] Int. Cl.[7] .................................................. G11B 5/733
[52] U.S. Cl. ........................ 428/328; 428/329; 428/402; 428/403; 428/694 BA; 428/694 BS; 428/900; 106/459; 423/633
[58] Field of Search .................................... 428/328, 329, 428/402, 403, 694 BA, 694 BS, 900; 106/459; 423/632, 633, 634

[56] References Cited

U.S. PATENT DOCUMENTS 5,750,250  5/1998  Hayashi et al. ........................ 428/328
5,753,027  5/1998  Bunt et al. ............................. 106/456

*Primary Examiner*—Stevan A. Resan
*Attorney, Agent, or Firm*—Nixon & Vanderhye

[57] ABSTRACT

Acicular hematite particles of the present invention contain zirconium of 0.05 to 30% by weight (calculated as Zr) based on the total weight of the particles, which is present within the particle, which have an average major axis diameter of not more than 0.3 μm and a pH value of not less than 8, and contain not more than 300 ppm of soluble sodium salt, calculated as Na and not more than 150 ppm of soluble sulfate, calculated as $SO_4$.

Such acicular hematite particles are suitable as non-magnetic particles for a non-magnetic undercoat layer of a magnetic recording medium which exhibits a low light transmittance, an excellent smooth surface, a high strength and an excellent durability, and can be prevented from being deteriorated in magnetic properties due to the corrosion of magnetic acicular metal particles containing iron as a main component which are dispersed in a magnetic recording layer thereof.

17 Claims, No Drawings

ACICULAR HEMATITE PARTICLES AND MAGNETIC RECORDING MEDIUM

BACKGROUND OF THE INVENTION

The present invention relates to acicular hematite particles and a magnetic recording medium, and more particularly, to acicular hematite particles suitable as non-magnetic particles for a non-magnetic undercoat layer of a magnetic recording medium which exhibits a low light transmittance, an excellent smooth surface, a high strength and an excellent durability, and can be prevented from being deteriorated in magnetic properties due to the corrosion of magnetic acicular metal particles containing iron as a main component, which are dispersed in a magnetic recording layer thereof; a non-magnetic substrate for the magnetic recording medium provided with a non-magnetic undercoat layer containing the acicular hematite particles; and the magnetic recording medium comprising the non-magnetic substrate and a magnetic recording layer containing magnetic acicular metal particles containing iron as a main component.

With a development of miniaturized, lightweight video or audio magnetic recording and reproducing apparatuses for long-time recording, magnetic recording media such as a magnetic tape and magnetic disk have been increasingly and strongly required to have a higher performance, namely, a higher recording density, higher output characteristic, in particular, an improved frequency characteristic and a lower noise level.

Various attempts have been made at both enhancing the properties of magnetic particles and reducing the thickness of a magnetic recording layer in order to improve these properties of a magnetic recording medium.

The enhancement of the properties of magnetic particles is firstly described.

The required properties of magnetic particles in order to satisfy the above-described demands on a magnetic recording medium, are a high coercive force and a large saturation magnetization.

As magnetic particles suitable for high-output and high-density recording, magnetic metal particles containing iron as a main component, which are obtained by heat-treating acicular goethite particles or acicular hematite particles in a reducing gas, are widely known.

Although magnetic acicular metal particles containing iron as a main component have a high coercive force and a large saturation magnetization, since the magnetic acicular metal particles containing iron as a main component used for a magnetic recording medium are very fine particles having a particle size of not more than 1 μm, particularly, 0.01 to 0.3 μm, they easily corrode and the magnetic characteristics thereof are deteriorated, especially, the saturation magnetization and the coercive force are decreased.

Therefore, in order to maintain the characteristics of a magnetic recording medium which uses magnetic acicular metal particles containing iron as a main component as magnetic particles, over a long period, it is strongly demanded to suppress the corrosion of magnetic acicular metal particles containing iron as a main component as much as possible.

A reduction in the thickness of a magnetic recording layer is described. Video tapes have recently been required more and more to have a higher picture quality, and the frequencies of carrier signals recorded in recent video tapes are higher than those recorded in conventional video tapes. In other words, the signals in the short-wave region have come to be used, and as a result, the magnetization depth from the surface of a magnetic tape has come to be remarkably small.

With respect to short wavelength signals, a reduction in the thickness of a magnetic recording layer is also strongly demanded in order to improve the high output characteristics, especially, the S/N ratio of a magnetic recording medium. This fact is described, for example, on page 312 of *Development of Magnetic Materials and Technique for High Dispersion of Magnetic Powder*, published by Sogo Gijutsu Center Co., Ltd. (1982), " . . . the conditions for high-density recording in a coated-layer type tape are that the noise level is low with respect to signals having a short wavelength and that the high output characteristics are maintained. To satisfy these conditions, it is necessary that the tape has large coercive force Hc and residual magnetization Br, . . . and the coating film has a smaller thickness . . . ".

Development of a thinner film for a magnetic recording layer has caused some problems.

Firstly, it is necessary to make a magnetic recording layer smooth and to eliminate the non-uniformity of thickness. As well known, in order to obtain a smooth magnetic recording layer having a uniform thickness, the surface of the base film must also be smooth. This fact is described on pages 180 and 181 of *Materials for Synthetic Technology—Causes of Friction and Abrasion of Magnetic Tape and Head Running System and Measures for Solving the Problem* (hereinunder referred to as "*Materials for Synthetic Technology*" (1987), published by the Publishing Department of Technology Information Center, " . . . the surface roughness of a hardened magnetic coating film depends on the surface roughness of the base film (back surface roughness) so largely as to be approximately proportional, . . . , since the magnetic coating film is formed on the base film, the more smooth the surface of the base film is, the more uniform and larger head output is obtained and the more the S/N ratio is improved."

Secondly, there has been caused a problem in the strength of a base film with a tendency of the reduction in the thickness of the base film in response to the demand for a thinner magnetic coating film. This fact is described, for example, on page 77 of the above-described *Development of Magnetic Materials and Technique for High Dispersion of Magnetic Powder*, " . . . Higher recording density is a large problem assigned t the present magnetic tape. This is important in order to shorten the length of the tape so as to miniaturize the size of a cassette and to enable long-time recording. For this purpose, it is necessary to reduce the thickness of a base film . . . With the tendency of reduction in the film thickness, the stiffness of the tape also reduces to such an extent as to make smooth travel in a recorder difficult. Therefore, improvement of the stiffness of a video tape both in the machine direction and in the transverse direction is now strongly demanded . . . ".

The end portion of a magnetic recording medium such as a magnetic tape, especially, a video tape is judged by detecting a portion of the magnetic recording medium at which the light transmittance is large by a video deck. If the light transmittance of the whole part of a magnetic recording layer is made large by the production of a thinner magnetic recording medium or the ultrafine magnetic particles dispersed in the magnetic recording layer, it is difficult to detect the portion having a large light transmittance by a video deck. For reducing the light transmittance of the whole part of a magnetic recording layer, carbon black or the like is added to the magnetic recording layer. It is, therefore, essential to add carbon black or the like to a magnetic recording layer in the present video tapes.

However, addition of a large amount of non-magnetic particles such as carbon black impairs not only the enhancement of the magnetic recording density but also the development of a thinner magnetic recording layer. In order to reduce the magnetization depth from the surface of the magnetic tape and to produce a thinner magnetic recording layer, it is demanded to reduce, as much as possible, the quantity of non-magnetic particles such as carbon black which are added to a magnetic recording layer.

It is, therefore, strongly demanded that the light transmittance of a magnetic recording layer should be small even if the carbon black or the like which is added to the magnetic recording layer is reduced to a small amount. From this point of view, improvements in the magnetic recording medium are now in strong demand.

There is no end to a demand for a higher performance in recent magnetic recording media. Since the above-described reduction in the thickness of a magnetic recording layer and a base film lowers the durability of the magnetic recording medium, an improvement of the durability of the magnetic recording medium is in strong demand.

This fact is described in Japanese Patent Application Laid-Open (KOKAI) No. 5-298679, " . . . With the recent development in magnetic recording, a high picture quality and a high sound quality have been required more and more in recording. The signal recording property is, therefore, improved. Especially, finer and higher-density ferromagnetic particles have come to be used. It is further required to make the surface of a magnetic tape smooth so as to reduce noise and raise the C/N . . . However, the coefficient of friction between the magnetic recording layer and an apparatus during the travel of the magnetic recording tape increases, so that there is a tendency of the magnetic recording layer of the magnetic recording medium being damaged or exfoliated even in a short time. Especially, in a videotape, since the magnetic recording medium travels at a high speed in contact with the video head, the ferromagnetic particles are apt to be dropped from the magnetic recording layer, thereby causing clogging on the magnetic head. Therefore, an improvement in the running durability of the magnetic recording layer of a magnetic recording medium is expected . . . ".

Various efforts have been made to improve the non-magnetic substrate for a magnetic recording layer with a demand for a thinner magnetic recording layer and a thinner base film. A magnetic recording medium having at least one undercoat layer (hereinunder referred to "non-magnetic undercoat layer") comprising a binder resin and hematite particles, which are dispersed therein, on a base film such as a base film has been proposed and put to practical use (Japanese Patent Publication (KOKOKU) No. 6-93297 (1994), Japanese Patent Application Laid-Open (KOKAI) Nos. 62-159338 (1987), 63-187418 (1988), 4-167225 (1992), 4-325915 (1992), 5-73882 (1993), 5-182177 (1993), 5-347017 (1993), 6-60362 (1994), etc.)

In addition, as non-magnetic particles used in the non-magnetic undercoat layer, there are known such non-magnetic particles which surfaces are treated with a zirconium compound in order to improve the dispersibility in vehicle or the like (Japanese Patents Nos. 2,566,088, 2,571, 350 and 2,582,051, and Japanese Patent Applications Laid-open (KOKAI) Nos. 6-60362(1994), 9-22524(1997), 9-27117(1997), 5-73883 (1993), 6-60360(1994), 8-50718 (1996), 8-255334(1996), 9-27116(1997), 9-27117(1997) and 9-35245(1997)).

With the reduction in thickness of not only magnetic recording layer but also non-magnetic substrate, it has been most demanded to provide a magnetic recording medium which can exhibit a low light transmittance, a smooth surface, a high strength and an excellent durability, and in which magnetic metal particles containing iron as a main component which are dispersed in the magnetic recording layer can be prevented from being corroded. However, such a magnetic recording medium has not been obtained yet.

Namely, the above-described magnetic recording media composed of a base film and a non-magnetic undercoat layer produced by dispersing non-magnetic particles in a binder resin and formed on a base film, have a small light transmittance, a smooth surface and a high strength, but the durability thereof is inconveniently poor.

This fact is described in Japanese Patent Application Laid-Open (KOKAI) No. 5-182177 (1993), " . . . Although the problem of surface roughness is solved by providing a magnetic layer as an upper layer after forming a thick non-magnetic undercoat layer on the surface of a base film, the problem of the abrasion of a head and the problem of durability are not solved and still remain. This is considered to be caused because a thermoset resin is usually used as a binder of the undercoat layer so that the magnetic layer is brought into contact with a head or other members without any cushioning owing to the hardened undercoat layer, and a magnetic recording medium having such an undercoat layer has a considerably poor flexibility."

Further, there has been pointed out such a problem that the magnetic metal particles containing iron as a main component, which are dispersed in the magnetic recording layer, undergoes corrosion after the production thereof, resulting in considerable deterioration in magnetic properties of the magnetic recording layer.

As a result of the present inventors' earnest studies, it has been found that when acicular hematite particles containing therewithin zirconium in an amount of 0.05 to 30% by weight (calculated as Zr) and having an average major axial diameter of not more than 0.3 $\mu$m, a pH value of not less than 8, a soluble sodium salt content of not more than 300 ppm (calculated as Na) and a soluble sulfate content of not more than 150 ppm (calculated as $SO_4$), are used as non-magnetic particles for a non-magnetic undercoat layer, there can be obtained a magnetic recording medium which comprises a non-magnetic undercoat layer having improved surface smoothness and strength, and a magnetic recording layer formed on the non-magnetic undercoat layer, and which can exhibit a low light transmittance, a high strength, a smooth surface and an excellent durability, and which can be effectively prevented from being deteriorated in magnetic properties by suppressing the corrosion of magnetic metal particles containing iron as a main component, which are dispersed in the magnetic recording layer. The present invention has been attained on the basis of the finding.

SUMMARY OF THE INVENTION

It is an object of the present invention to provide acicular hematite particles suitable as non-magnetic particles for a non-magnetic undercoat layer having a smooth surface and a high strength.

It is another object of the present invention to provide a non-magnetic substrate for the magnetic recording medium having the non-magnetic undercoat layer containing the acicular hematite particles having a low light transmittance, a smooth surface, a high strength and an excellent durability.

It is an other object of the present invention to provide a magnetic recording medium which can exhibit a low light transmittance, a smooth surface, a high strength and an excellent durability, and can be prevented from being deteriorated in magnetic properties due to the corrosion of magnetic acicular metal particles containing iron as a main component contained in a magnetic recording layer thereof.

To accomplish the aims, in a first aspect of the present invention, there are provided acicular hematite particles containing zirconium of 0.05 to 30% by weight, calculated as Zr, based on the total weight of the particles, which zirconium is present within the particle, having an average major axis diameter of not more than 0.3 μm and a pH value of not less than 8, and containing not more than 300 ppm of soluble sodium salt, calculated as Na, and not more than 150 ppm of soluble sulfate, calculated as $SO_4$.

In a second aspect of the present invention, there are provided acicular hematite particles comprising:

an acicular hematite particle as a core particle containing zirconium of 0.05 to 30% by weight, calculated as Zr, based on the total weight of the particles, which zirconium is present within the particle, and a coat formed on at least a part of the surface of the acicular hematite particle as a core particle, comprising at least one compound selected from the group consisting of hydroxides of aluminum, oxides of aluminum, hydroxides of silicon and oxides of silicon in amount of 0.05 to 50% by weight, calculated as Al or $SiO_2$, based on the total weight of the acicular hematite particles; and having an average major axis diameter of not more than 0.3 μm and a pH value of not less than 8, and containing not more than 300 ppm of soluble sodium salt, calculated as Na, and not more than 150 ppm of soluble sulfate, calculated as $SO_4$.

In a third aspect of the present invention, there is provided a magnetic recording medium comprising:

a non-magnetic base film;

a non-magnetic undercoat layer formed on said non-magnetic base film, comprising a binder resin and acicular hematite particles containing zirconium of 0.05 to 30% by weight, calculated as Zr, based on the total weight of the particles, which zirconium is present within the particle, having an average major axis diameter of not more than 0.3 μm and a pH value of not less than 8, and containing not more than 300 ppm of soluble sodium salt, calculated as Na, and not more than 150 ppm of soluble sulfate, calculated as $SO_4$; and a magnetic coating film comprising a binder resin and magnetic acicular metal particles containing iron as a main component.

In a fourth aspect of the present invention, there is provided a magnetic recording medium comprising:

a non-magnetic base film;

a non-magnetic undercoat layer formed on said non-magnetic base film, comprising a binder resin and acicular hematite particles comprising: an acicular hematite particle as a core particle containing zirconium of 0.05 to 30% by weight, calculated as Zr, based on the total weight of the particles, which zirconium is present within the particle, and a coat formed on at least a part of the surface of the acicular hematite particle as a core particle, comprising at least one compound selected from the group consisting of hydroxides of aluminum, oxides of aluminum, hydroxides of silicon and oxides of silicon in amount of 0.05 to 50% by weight, calculated as Al or $SiO_2$, based on the total weight of the acicular hematite particles, and the acicular hematite particles having an average major axis diameter of not more than 0.3 μm and a pH value of not less than 8, and containing not more than 300 ppm of soluble sodium salt, calculated as Na, and not more than 150 ppm of soluble sulfate, calculated as $SO_4$; and a magnetic coating film comprising a binder resin and magnetic acicular metal particles containing iron as a main component.

In a fifth aspect of the present invention, there is provided a non-magnetic substrate comprising:

a non-magnetic base film; and a non-magnetic undercoat layer formed on said non-magnetic base film, comprising a binder resin and acicular hematite particles containing zirconium of 0.05 to 30% by weight, calculated as Zr, based on the total weight of the particles, which zirconium is present within the particle, having an average major axis diameter of nor more than 0.3 μm and a pH value of not less than 8, and containing not more than 300 ppm of soluble sodium salt, calculated as Na, and not more than 150 ppm of soluble sulfate, calculated as $SO_4$.

In a sixth aspect of the present invention, there is provided a non-magnetic substrate comprising:

a non-magnetic base film; and a non-magnetic undercoat layer formed on said non-magnetic base film, comprising a binder resin and acicular hematite particles comprising: an acicular hematite particle as a core particle containing zirconium of 0.05 to 30% by weight, calculated as Zr, based on the total weight of the particles, which zirconium is present within the particle, and a coat formed on at least a part of the surface of the acicular hematite particle as a core particle, comprising at least one compound selected from the group consisting of hydroxides of aluminum, oxides of aluminum, hydroxides of silicon and oxides of silicon in amount of 0.05 to 50% by weight, calculated as Al or $SiO_2$, based on the total weight of the acicular hematite particles, and the acicular hematite particles having an average major axis diameter of not more than 0.3 μm and a pH value of not less than 8, and containing not more than 300 ppm of soluble sodium salt, calculated as Na, and not more than 150 ppm of soluble sulfate, calculated as $SO_4$.

DETAILED DESCRIPTION OF THE INVENTION

The present invention is explained in more detail below.

First, the acicular hematite particles for a non-magnetic undercoat layer of a magnetic recording medium according to the present invention are described.

The acicular hematite particles according to the present invention contain zirconium in an amount of 0.05 to 30% by weight (calculated as Zr) based on the total weight of the particles, which zirconium is present within the particle, substantially uniformly.

When the zirconium content within the acicular hematite particles is less than 0.05% by weight (calculated as Zr) based on the total weight of the particles, a magnetic recording medium having a non-magnetic undercoat layer containing such acicular hematite particles does not have a sufficient durability. If the zirconium content exceeds 30% by weight (calculated as Zr) based on the total weight of the particles, although a magnetic recording medium having the non-magnetic undercoat layer containing such acicular hematite particles has a sufficient durability, the durability-improving effect becomes saturated, so that it is meaningless to add zirconium more than necessary. From the point of view of an industrial productivity and more excellent durability of a magnetic recording medium, the zirconium content therein is preferably 0.5 to 25% by weight, more preferably 1.0 to 20% by weight (calculated as Zr) based on the total weight of the particles.

The acicular hematite particles according to the present invention may include not only acicular shape but also spindle shape, rice-ball shape or the like.

The acicular hematite particles according to the present invention have an aspect ratio (average major axial diameter/average minor axial diameter) (hereinunder referred to merely as "aspect ratio") of 2:1 to 20:1.

If the aspect ratio is less than 2:1, it is difficult to obtain a desired film strength of the magnetic recording medium. If the aspect ratio is more than 20:1, the particles may be entangled with each other in vehicle, thereby reducing the dispersibility and increasing the viscosity of the non-magnetic coating composition. With the consideration of the dispersibility in the vehicle and the strength of the coated film, the aspect ratio is preferably 3:1 to 10:1.

The average major axial diameter of the non-magnetic acicular particles containing iron as a main component used in the present invention is not more than 0.3 μm, preferably 0.005 to 0.3 μm. If the average major axial diameter exceeds 0.3 μm, the particle size is so large as to impair the surface smoothness of the coated film. On the other hand, if the average major axial diameter is less than 0.005 μm, dispersion in the vehicle may be unfavorably apt to be difficult because of the increase of the intermolecular force due to the fine particles. With the consideration of the dispersibility in the vehicle and the surface smoothness of the coated film, the more preferable average major axial diameter is 0.02 to 0.2 μm.

The average minor axial diameter of the non-magnetic acicular particles containing iron as a main component used in the present invention is preferably 0.0025 to 0.15 μm. If the average minor axial diameter is less than 0.0025 μm, dispersion in the vehicle may be unfavorably difficult because of the increase of the intermolecular force due to the fine particles. On the other hand if the average minor axial diameter exceeds 0.15 μm, the particle size may be apt to become so large as to impair the surface smoothness of the coated film. With the consideration of the dispersibility in the vehicle and the surface smoothness of the coated film, the more preferable average minor axial diameter is 0.01 to 0.10 μm.

The pH value of the acicular hematite particles is not less than 8. If it is less than 8, the magnetic acicular metal particles containing iron as a main component which are contained in the magnetic recording layer formed on the non-magnetic undercoat layer are gradually corroded, which causes a deterioration in the magnetic characteristics. In consideration of a corrosion preventive effect on the magnetic acicular metal particles containing iron as a main component, the lower limit of the pH value of the acicular hematite particles is preferably not less than 8.5, more preferably not less than 9.0. The upper limit of the pH value of the acicular hematite particles is preferably 11, more preferably 10.5.

The content of soluble sodium salt in the acicular hematite particles is not more than 300 ppm (calculated as Na). If it exceeds 300 ppm, the magnetic acicular metal particles containing iron as a main component contained in the magnetic recording layer formed on the non-magnetic undercoat layer are gradually corroded, thereby causing a deterioration in the magnetic characteristics. In addition, the dispersion property of the acicular hematite particles in the vehicle is easily impaired, and the preservation of the magnetic recording medium is deteriorated and chalking is sometimes caused in a highly humid environment. In consideration of a corrosion preventive effect on the magnetic acicular metal particles containing iron as a main component, the content of soluble sodium salt in the acicular hematite particles is preferably not more than 250 ppm, more preferably not more than 200 ppm, even more preferably not more than 150 ppm. From the point of view of industry such as productivity, the lower limit thereof is about 0.01 ppm.

The content of soluble sulfate in the acicular hematite particles is not more than 150 ppm (calculated as $SO_4$). If it exceeds 150 ppm, the magnetic acicular metal particles containing iron as a main component contained in the magnetic recording layer formed on the non-magnetic undercoat layer are gradually corroded, thereby causing a deterioration in the magnetic properties. In addition, the dispersion property of the acicular hematite particles in the vehicle is easily impaired, and the preservation of the magnetic recording medium is deteriorated and chalking is sometimes caused in a highly humid environment. In consideration of a corrosion preventive effect on the magnetic acicular metal particles containing iron as a main component, the content of soluble sodium salt in the acicular hematite particles is preferably not more than 70 ppm, more preferably not more than 50 ppm. From the point of view of industry such as productivity, the lower limit thereof is about 0.01 ppm.

The BET specific surface area of the acicular hematite particle according to the present invention is usually not less than 35 $m^2/g$. If it is less than 35 $m^2/g$, the acicular hematite particles may be coarse or sintering may be sometimes caused between particles, which are apt to exert a deleterious influence on the surface smoothness of the coated film. The BET surface area is preferably not less than 37 $m^2/g$, more preferably not less than 40 $m^2/g$, and the upper limit thereof is usually 180 $m^2/g$. The upper limit is preferably 160 $m^2/g$, more preferably 150 $m^2/g$ with the consideration of the dispersibility in the vehicle.

The upper limit of the geometrical standard deviation of the major axis diameter of the acicular hematite particles according to the present invention is usually not more than 1.50. If the upper limit of the geometrical standard deviation of the major axis diameter exceeds 1.50, the coarse particles existent sometimes exert a deleterious influence on the surface smoothness of the coating film. With the consideration of the surface smoothness of the coating film, the upper limit thereof is preferably 1.48, more preferably not more than 1.45. From the point of view of industrial productivity, the lower limit thereof is preferably 1.01.

The acicular hematite particles for a non-magnetic undercoat layer of a magnetic recording medium according to the present invention have a high degree of densification. When the degree of densification is represented by a ratio value of the specific surface area ($S_{BET}$) measured by a BET method to the surface area ($S_{TEM}$) calculated from the major axis diameter and the minor axis diameter which were measured from the particles in an electron micrograph of the acicular hematite particles (hereinafter referred to merely as "$S_{BET}/S_{TEM}$ value"), the $S_{BET}/S_{TEM}$ value is 0.5 to 2.5.

When the $S_{BET}/S_{TEM}$ value is less than 0.5, although the acicular hematite particles are highly densified, the particle diameter thereof may be increased due to sintering between particles, so that a coating film formed using these particles, may not have a sufficient smooth surface. On the other hand, when the $S_{BET}/S_{TEM}$ value is more than 2.5, the degree of densification of the particles is insufficient, so that many pores tend to be formed on the surface and inside of the particle, resulting in insufficient dispersibility of the particles in vehicle. With the consideration of the smooth surface of the coating film and the dispersibility in the vehicle, the $S_{BET}/S_{TEM}$ value is preferably 0.7 to 2.0, more preferably 0.8 to 1.6.

The resin adsorptivity of the acicular hematite particles according to the present invention is usually not less than 60%, preferably not less than 65%, more preferably not less than 68%. The upper limit thereof is preferably 95%.

The surface of the acicular hematite particle according to the present invention may be coated with at least one coat material selected from the group consisting of a hydroxide of aluminum, an oxide of aluminum, a hydroxide of silicon and an oxide of silicon. When the acicular hematite particle which is coated with the above-described coat material are dispersed in a vehicle, the treated particles have an affinity with the binder resin and it is easy to obtain a desired dispersibility.

The amount of aluminum hydroxide, aluminum oxide, silicon hydroxide or silicon oxide used as the coat material is preferably 0.01 to 50% by weight (calculated as Al and/or $SiO_2$) based on the total weight of the particles. If it is less than 0.01% by weight (calculated as Al and/or $SiO_2$) based on the total weight of the particles, the dispersibility-improving effect caused by coating may be insufficient. If the amount exceeds 50% by weight (calculated as Al and/or $SiO_2$) based on the total weight of the particles, the dispersibility-improving effect caused by coating becomes saturated, so that it is meaningless to add a coat material more than necessary. From the point of view of dispersibility in the vehicle and industrial productivity, the more preferable amount of coat material is 0.05 to 20% by weight (calculated as Al and/or $SiO_2$) based on the total weight of the particles.

Various properties of the acicular hematite particles which are coated with a coat material, such as pH value, content of soluble sodium salt, content of soluble sulfate, aspect ratio, average major axial diameter, average minor axial diameter, BET specific surface area, geometrical standard deviation of the major axial diameter, degree of densification and resin adsorptivity are approximately equivalent in values to those of the acicular hematite particles used, the surfaces of which are not coated with a coat material.

Next, the magnetic recording medium according to the present invention is described.

The magnetic recording medium according to the present invention comprises:
 a non-magnetic substrate comprising a non-magnetic base film and a non-magnetic undercoat layer formed on the non-magnetic base film, comprising a binder resin and the acicular hematite particles; and
 a magnetic coating film formed on the non-magnetic undercoat layer, comprising a binder resin and magnetic particles.

Firstly, the non-magnetic substrate having the non-magnetic undercoat layer according to the present invention is described.

The non-magnetic substrate of the present invention is produced by forming a coating film on the non-magnetic base film and drying the coating film. The coating film is formed by applying a non-magnetic coating composition which contains the acicular hematite particles, a binder resin and a solvent, to the surface of the non-magnetic base film.

As the non-magnetic base film, the following materials which are at present generally used for the production of a magnetic recording medium are usable as a raw material: a synthetic resin such as polyethylene terephthalate, polyethylene, polypropylene, polycarbonate, polyethylene naphthalate, polyamide, polyamideimide and polyimide; foil and plate of a metal such as aluminum and stainless steel; and various kinds of paper. The thickness of the non-magnetic base film varies depending upon the material, but it is usually about 1.0 to 300 μm, preferably 2.0 to 200 μm.

In the case of a magnetic disc, polyethylene terephthalate is usually used as the non-magnetic base film, and the thickness thereof is usually 50 to 300 μm, preferably 60 to 200 μm.

In a magnetic tape, when polyethylene terephthalate is used as the non-magnetic base film, the thickness thereof is usually 3 to 100 μm, preferably 4 to 20 μm; when polyethylene naphthalate is used, the thickness thereof is usually 3 to 50 μm, preferably 4 to 20 μm; and when polyamide is used, the thickness thereof is usually 2 to 10 μm preferably 3 to 7 μm.

The thickness of the non-magnetic undercoat layer obtained by applying a non-magnetic coating composition on the surface of the non-magnetic base film and drying, is usually 0.2 to 10.0 μm, preferably 0.5 to 5.0 μm. If the thickness is less than 0.2 μm, not only it is difficult to ameliorate the surface roughness of the non-magnetic substrate but also the strength is insufficient. If the thickness is more than 10 μm, it is difficult to reduce the thickness of the magnetic recording medium.

As the binder resin used in the present invention, the following resins which are at present generally used for the production of a magnetic recording medium are usable: vinyl chloride-vinyl acetate copolymer, urethane resin, vinyl chloride-vinyl acetate-maleic acid copolymer, urethane elastomer, butadiene-acrylonitrile copolymer, polyvinyl butyral, cellulose derivative such as nitrocellulose, polyester resin, synthetic rubber resin such as polybutadiene, epoxy resin, polyamide resin, polyisocyanate, electron radiation curing acryl urethane resin and mixtures thereof. Each of these resin binders may contain a functional group such as —OH, —COOH, —$SO_3M$, —$OPO_2M_2$ and —$NH_2$, wherein M represents H, Na or K. With the consideration of the dispersibility of the particles, a binder resin containing a functional group —COOH or —$SO_3M$ is preferable.

The mixing ratio of the acicular hematite particles with the binder resin is usually 5 to 2000 parts by weight, preferably 100 to 1000 parts by weight based on 100 parts by weight of the binder resin.

It is possible to add a lubricant, a polishing agent, an antistatic agent, etc. which are generally used for the production of a magnetic recording medium to the non-magnetic undercoat layer.

In case of using the acicular hematite particles as defined in the first aspect as non-magnetic particles, the non-magnetic substrate according to the present invention has a gloss (of the coating film) of usually 185 to 280%, preferably 190 to 280%, more preferably 195 to 280%; a surface roughness Ra (of the coating film) of usually 2.0 to 10.0 nm, preferably 2.0 to 9.0 nm, more preferably 2.0 to 8.0 nm; and a Young's modulus (relative value to a commercially available video tape: and AV T-120 produced by Victor Company of Japan, Limited) of usually 120 to 160, preferably 125 to 160.

In case of using the acicular hematite particles as defined in the second aspect as non-magnetic particles, which particle has a coat comprising at least one compound selected from the group consisting of hydroxides of aluminum, oxides of aluminum, hydroxides of silicon and oxides of silicon, the non-magnetic substrate according to the present invention has a gloss (of the coating film) of usually 190 to 280%, preferably 193 to 280%, more preferably 196 to 280%; a surface roughness Ra (of the coating film) of usually 2.0 to 9.0 nm, preferably 2.0 to 8.0 nm, more preferably 2.0 to 7.4 nm; and a Young's modulus (relative value to a commercially available video tape: and AV T-120 produced by Victor Company of Japan, Limited) of usually 120 to 160, preferably 125 to 160.

As the magnetic particles used in the present invention, magnetic acicular metal particles containing iron as a main component are usable.

The magnetic acicular metal particles containing iron as a main ingredient used in the present invention comprises iron and at least one selected from the group consisting of Co, Al, Ni, P, Si, Zn, Ti, B, Nd, La and Y. Further, the following magnetic acicular metal particles containing iron as a main component may be exemplified.

1) Magnetic acicular metal particles containing iron as a main component comprises iron; and cobalt of usually 0.05 to 40% by weight, preferably 1.0 to 35% by weight, more preferably 3 to 30% by weight (calculated as Co) based on the weight of the magnetic acicular metal particles containing iron as a main component.

2) Magnetic acicular metal particles containing iron as a main component comprises iron; and aluminum of usually 0.05 to 10% by weight, preferably 0.1 to 7% by weight (calculated as Al) based on the weight of the magnetic acicular metal particles containing iron as a main component.

3) Magnetic acicular metal particles containing iron as a main component comprises iron; cobalt of usually 0.05 to 40% by weight, preferably 1.0 to 35% by weight, more preferably 3 to 30% by weight (calculated as Co) based on the weight of the magnetic acicular metal particles containing iron as a main component; and aluminum of usually 0.05 to 10% by weight, preferably 0.1 to 7% by weight (calculated as Al) based on the weight of the magnetic acicular metal particles containing iron as a main component.

4) Magnetic acicular metal particles containing iron as a main component comprises iron; cobalt of usually 0.05 to 40% by weight, preferably 1.0 to 35% by weight, more preferably 3 to 30% by weight (calculated as Co) based on the weight of the magnetic acicular metal particles containing iron as a main component; and at least one selected from the group consisting of Nd, La and Y of usually 0.05 to 10% by weight, preferably 0.1 to 7% by weight (calculated as the corresponding element) based on the weight of the magnetic acicular metal particles containing iron as a main component.

5) Magnetic acicular metal particles containing iron as a main component comprises iron; aluminum of usually 0.05 to 10% by weight, preferably 0.1 to 7% by weight (calculated as Al) based on the weight of the magnetic acicular metal particles containing iron as a main component; and at least one selected from the group consisting of Nd, La and Y of usually 0.05 to 10% by weight, preferably 0.1 to 7% by weight (calculated as the corresponding element) based on the weight of the magnetic acicular metal particles containing iron as a main component.

6) Magnetic acicular metal particles containing iron as a main component comprises iron; cobalt of usually 0.05 to 40% by weight, preferably 1.0 to 35% by weight, more preferably 3 to 30% by weight (calculated as Co) based on the weight of the magnetic acicular metal particles containing iron as a main component; aluminum of usually 0.05 to 10% by weight, preferably 0.1 to 7% by weight (calculated as Al) based on the weight of the magnetic acicular metal particles containing iron as a main component; and at least one selected from the group consisting of Nd, La and Y of usually 0.05 to 10% by weight, preferably 0.1 to 7% by weight (calculated as the corresponding element) based on the weight of the magnetic acicular metal particles containing iron as a main component.

7) Magnetic acicular metal particles containing iron as a main component comprises iron; cobalt of usually 0.05 to 40% by weight, preferably 1.0 to 35% by weight, more preferably 3 to 30% by weight (calculated as Co) based on the weight of the magnetic acicular metal particles containing iron as a main component; and at least one selected from the group consisting of Ni, P, Si, Zn, Ti and B of usually 0.05 to 10% by weight, preferably 0.1 to 7% by weight (calculated as the corresponding element) based on the weight of the magnetic acicular metal particles containing iron as a main component.

8) Magnetic acicular metal particles containing iron as a main component comprises iron; aluminum of usually 0.05 to 10% by weight, preferably 0.1 to 7% by weight (calculated as Al) based on the weight of the magnetic acicular metal particles containing iron as a main component; and at least one selected from the group consisting of Ni, P, Si, Zn, Ti and B of usually 0.05 to 10% by weight, preferably 0.1 to 7% by weight (calculated as the corresponding element) based on the weight of the magnetic acicular metal particles containing iron as a main component.

9) Magnetic acicular metal particles containing iron as a main component comprises iron; cobalt of usually 0.05 to 40% by weight, preferably 1.0 to 35% by weight, more preferably 3 to 30% by weight (calculated as Co) based on the weight of the magnetic acicular metal particles containing iron as a main component; aluminum of usually 0.05 to 10% by weight, preferably 0.1 to 7% by weight (calculated as Al) based on the weight of the magnetic acicular metal particles containing iron as a main component; and at least one selected from the group consisting of Ni, P, Si, Zn, Ti and B of usually 0.05 to 10% by weight, preferably 0.1 to 7% by weight (calculated as the corresponding element) based on the weight of the magnetic acicular metal particles containing iron as a main component.

10) Magnetic acicular metal particles containing iron as a main component comprises iron; cobalt of usually 0.05 to 40% by weight, preferably 1.0 to 35% by weight, more preferably 3 to 30% by weight (calculated as Co) based on the weight of the magnetic acicular metal particles containing iron as a main component; at least one selected from the group consisting of Nd, La and Y of usually 0.05 to 10% by weight, preferably 0.1 to 7% by weight (calculated as the corresponding element) based on the weight of the magnetic acicular metal particles containing iron as a main component; and at least one selected from the group consisting of Ni, P, Si, Zn, Ti and B of usually 0.05 to 10% by weight, preferably 0.1 to 7% by weight (calculated as the corresponding element) based on the weight of the magnetic acicular metal particles containing iron as a main component.

11) Magnetic acicular metal particles containing iron as a main component comprises iron; aluminum of usually y 0.05 to 10% by weight, preferably 0.1 to 7% by weight (calculated as Al) based on the weight of the magnetic acicular metal particles containing iron as a main component; at least one selected from the group consisting of Nd, La and Y of ordinarily 0.05 to 10% by weight, preferably 0.1 to 7% by weight (calculated as the corresponding element) based on the weight of the magnetic acicular metal particles containing iron as a main component; and at least one selected from the group consisting of Ni, P, Si, Zn, Ti and B of usually 0.05 to 10% by weight, preferably 0.1 to 7% by weight (calculated as the corresponding element) based on the weight of the magnetic acicular metal particles containing iron as a main component.

12) Magnetic acicular metal particles containing iron as a main component comprises iron; cobalt of usually 0.05 to 40% by weight, preferably 1.0 to 35% by weight, more preferably 3 to 30% by weight (calculated as Co) based on the weight of the magnetic acicular metal particles containing iron as a main component; aluminum of usually 0.05 to 10% by weight, preferably 0.1 to 7% by weight (calculated as Al) based on the weight of the magnetic acicular metal particles containing iron as a main component; at least one selected from the group consisting of Nd, La and Y of usually 0.05 to 10% by weight, preferably 0.1 to 7% by weight (calculated as the corresponding element) based on the weight of the magnetic acicular metal particles containing iron as a main component; and at least one selected from the group consisting of Ni, P, Si, Zn, Ti and B of usually 0.05 to 10% by weight, preferably 0.1 to 7% by weight (calculated as the corresponding element) based on the weight of the magnetic acicular metal particles containing iron as a main component.

The iron content in the particles is the balance, and is preferably 50 to 99% by weight, more preferably 60 to 95% by weight (calculated as Fe) based on the weight of the magnetic acicular metal particles containing iron as a main component.

From the consideration of the excellent durability of the magnetic recording medium, it is preferred to use as magnetic particles magnetic acicular metal particles containing iron as a main component, which contain aluminum of 0.05 to 10% by weight (calculated as Al) based on the weight of the magnetic acicular metal particles containing iron as a main component, which are present within the particle.

It is more preferable to use as magnetic particles magnetic acicular metal particles containing iron as a main component containing Al in an amount of 0.05 to 10% by weight (calculated as Al) based on the weight of the magnetic acicular metal particles and a rare-earth metal such as Nd, La and Y in an amount of 0.05 to 10% by weight (calculated as element) based on the weight of the magnetic acicular metal particles. Especially, magnetic acicular metal particles containing iron as a main component containing Al and Nd therein are the even more preferable.

When a magnetic recording medium is produced using as the magnetic particles magnetic acicular metal particles containing iron as a main component, which contain aluminum of not less than 0.05% by weight (calculated as Al) based on the weight of the magnetic acicular metal particles, the durability thereof is more improved because the resin adsorptivity of the magnetic acicular metal particles containing iron as a main component, which contain aluminum is improved. When the content of aluminum exceeds 10% by weight, the effect of improving the durability of the magnetic recording layer or the magnetic recording medium is observed, but the effect is saturated and it is meaningless to add aluminum more than necessary. Furthermore, the magnetic characteristics of the magnetic acicular metal particles containing iron as a main component may be sometimes deteriorated due to an increase in the aluminum as a nonmagnetic component.

With respect to the existing position of aluminum of usually 0.05 to 10% by weight (calculated as Al) based on the weight of the magnetic acicular metal particles containing iron as a main component, it may be uniformly contained only in the core or inside portions, and/or in the surface portion of the magnetic acicular metal particles containing iron as a main component. Alternatively, aluminum may be approximately uniformly contained in the magnetic acicular metal particles containing iron as a main component from the core portion to the surface. An aluminum-coating layer may be formed on the surfaces of the particles. In addition, any of these positions may be combined. In the consideration of the effect of improving the surface property of the magnetic recording layer or the durability of the magnetic recording medium, magnetic acicular metal particles containing iron as a main component, which uniformly contain aluminum from the core portion to the surface and are coated with an aluminum-coating layer are more preferable.

The magnetic acicular metal particles containing iron as a main component, which contain aluminum within the particles are produced, as is well known, by adding an aluminum compound at an appropriate stage during the process for producing acicular goethite particles to produce acicular goethite particles containing aluminum at desired positions of the particles, and heat-reducing the obtained acicular goethite particles or acicular hematite particles containing aluminum at desired positions within the particles which are produced by heat-dehydrating the acicular goethite particles at a temperature of 300 to 500° C.

The magnetic acicular metal particles containing iron as a main component, which are coated with aluminum are produced by heat-reducing the acicular goethite particles coated with an oxide or hydroxide of aluminum, or the acicular hematite particles coated with the oxide or hydroxide of aluminum which are obtained by dehydrating the acicular goethite particles at a temperature of 300 to 500° C.

The magnetic acicular metal particles containing iron as a main component used in the present invention have an average major axial diameter of usually 0.01 to 0.50 µm, preferably 0.03 to 0.30 µm, an average minor axial diameter of usually 0.0007 to 0.17 µm, preferably 0.002 to 0.10 µm, and an aspect ratio of usually not less than 3:1, preferably not less than 5:1. The upper limit of the aspect ratio is usually 15:1, preferably 10:1 with the consideration of the dispersibility in the vehicle. The shape of the a magnetic acicular metal particles containing iron as a main component may have not only acicular but also spindle-shaped, rice ball-shaped, or the like.

The geometrical standard deviation of the major axis diameter of the magnetic acicular metal particles containing iron as a main component used in the present invention is preferably not more than 2.50. If it exceeds 2.50, the coarse particles existent sometimes exert a deleterious influence on the surface smoothness of the magnetic recording layer. From the point of view of industrial productivity, the lower limit of the geometrical standard deviation of the major axis diameter is preferably 1.01.

The resin adsorptivity of the magnetic acicular metal particles containing iron as a main component, which contain aluminum used in the present invention is usually not less than 65%, preferably not less than 68%, more preferably not less than 70%.

As to the magnetic properties of the magnetic acicular metal particles containing iron as a main component used in the present invention, the coercive force is usually 800 to 3500 Oe, preferably 900 to 3500 Oe, more preferably 1000 to 3500 Oe, and the saturation magnetization is usually preferably 100 to 170 emu/g, preferably 110 to 170 emu/g with the consideration of the properties such as high-density recording.

As the binder resin for the magnetic recording layer, the same binder resin as that used for the production of the non-magnetic undercoat layer is usable.

The mixing ratio of the magnetic acicular metal particles containing iron as a main component with the binder resin in the magnetic recording layer is usually 200 to 2000 parts by weight, preferably 300 to 1500 parts by weight based on 100 parts by weight of the binder resin.

It is possible to add a lubricant, a polishing agent, an antistatic agent, etc., which are generally used for the production of a magnetic recording medium to the magnetic recording layer.

The thickness of the magnetic recording layer obtained by applying the magnetic coating composition on the surface of the non-magnetic undercoat layer and dried, is usually in the range of 0.01 to 5.0 $\mu$m. If the thickness is less than 0.01 $\mu$m, uniform coating may be difficult, so that unfavorable phenomenon such as unevenness on the coating surface is observed. On the other hand, when the thickness exceeds 5.0 $\mu$m, it may be difficult to obtain desired signal recording property due to an influence of diamagnetism. The preferable thickness is in the range of 0.05 to 1.0 $\mu$m.

In case of using the acicular hematite particles as defined in the first aspect as non-magnetic particles, the magnetic recording medium according to the present invention has a coercive force of usually 800 to 3500 Oe, preferably 900 to 3500 Oe, more preferably 1000 to 3500 Oe; a squareness (residual magnetic flux density Br/saturation magnetic flux density Bm) of usually 0.85 to 0.95, preferably 0.86 to 0.95; a gloss (of the coating film) of usually 200 to 300%, preferably 210 to 300%; a surface roughness Ra (of the coating film) of usually not more than 10.0 nm, preferably 2.0 to 9.0 nm, more preferably 2.0 to 8.0 nm; a Young's modulus (relative value to a commercially available video tape: AV T-120 produced by Victor Company of Japan, Limited) of usually not less than 129, preferably not less than 132; and a linear adsorption coefficient (of the coating film) of usually 1.10 to 2.00 $\mu m^{-1}$, preferably 1.20 to 2.00 $\mu m^{-1}$. As to the durability, the running durability of the magnetic recording medium is usually not less than 17 minutes, preferably not less than 20 minutes, more preferably not less than 22 minutes. Also, the scratch resistance of the magnetic recording medium is usually A or B, preferably A, when evaluated into four ranks: A (No scratch), B (A few scratches), C (Many scratches) and D (A great many scratches). In addition, the anti-corrosion property of the magnetic recording medium is not more than 10.0%, preferably not more than 9.5% when represented by a percentage of change in coercive force Hc (%), and not more than 10.0%, preferably not more than 9.5% when represented by a percentage of change in saturation magnetization Bm (%).

In case of using the acicular hematite particles as defined in the second aspect as non-magnetic particles, the magnetic recording medium according to the present invention has a coercive force of usually 800 to 3500 Oe, preferably 900 to 3500 Oe, more preferably 1000 to 3500 Oe; a squareness (residual magnetic flux density Br/saturation magnetic flux density Bm) of usually 0.85 to 0.95, preferably 0.86 to 0.95; a gloss (of the coating film) of usually 205 to 300%, preferably 215 to 300%; a surface roughness Ra (of the coating film) of usually not more than 9.5 nm, preferably 2.0 to 8.5 nm, more preferably 2.0 to 7.5 nm; a Young's modulus (relative value to a commercially available video tape: AV T-120 produced by Victor Company of Japan, Limited) of usually not less than 129, preferably not less than 132; and a linear adsorption coefficient (of the coating film) of usually 1.10 to 2.00 $\mu m^{-1}$, preferably 1.20 to 2.00 $\mu m^{-1}$. As to the durability, the running durability of the magnetic recording medium is usually not less than 19 minutes, preferably not less than 21 minutes, more preferably not less than 23 minutes. Also, the scratch resistance of the magnetic recording medium is usually A or B, preferably A, when evaluated into four ranks: A (No scratch), B (A few scratches), C (Many scratches) and D (A great many scratches). In addition, the anti-corrosion property of the magnetic recording medium is not more than 10.0%, preferably not more than 9.5% when represented by a percentage of change in coercive force Hc (%), and not more than 10.0%, preferably not more than 9.5% when represented by a percentage of change in saturation magnetization Bm (%).

In case of using the acicular hematite particles as defined in the first aspect as non-magnetic particles and the magnetic acicular metal particles containing iron as a main component, which contain aluminum, as the magnetic particles, the magnetic recording medium according to the present invention has a coercive force of usually 800 to 3500 Oe, preferably 900 to 3500 Oe, more preferably 1000 to 3500 Oe; a squareness (residual magnetic flux density Br/saturation magnetic flux density Bm) of usually 0.85 to 0.95, preferably 0.86 to 0.95; a gloss (of the coating film) of usually 200 to 300%, preferably 210 to 300%; a surface roughness Ra (of the coating film) of usually not more than 10.0 nm, preferably 2.0 to 9.0 nm, more preferably 2.0 to 8.0 nm; a Young's modulus (relative value to a commercially available video tape: AV T-120 produced by Victor Company of Japan, Limited) of usually not less than 129, preferably not less than 132; and a linear adsorption coefficient (of the coating film) of usually 1.10 to 2.00 $\mu m^{-1}$, preferably 1.20 to 2.00 $\mu m^{-1}$. As to the durability, the running durability of the magnetic recording medium is usually not less than 20 minutes, preferably not less than 22 minutes, more preferably not less than 25 minutes. Also, the scratch resistance of the magnetic recording medium is usually A or B, preferably A, when evaluated into four ranks: A (No scratch), B (A few scratches), C (many scratches) and D (A great many scratches). In addition, the anti-corrosion property of the magnetic recording medium is not more than 10.0%, preferably not more than 9.5% when represented by a percentage of change in coercive force Hc (%), and not more than 10.0%, preferably not more than 9.5% when represented by a percentage of change in saturation magnetization Bm (%).

In case of using the acicular hematite particles as defined in the second aspect as non-magnetic particles and the magnetic acicular metal particles containing iron as a main component, which contain aluminum, as the magnetic particles, the magnetic recording medium according to the present invention has a coercive force of usually 800 to 3500 Oe, preferably 900 to 3500 Oe, more preferably 1000 to 3500 Oe; a squareness (residual magnetic flux density Br/saturation magnetic flux density Bm) of usually 0.85 to 0.95, preferably 0.86 to 0.95; a gloss (of the coating film) of usually 205 to 300%, preferably 215 to 300%; a surface roughness Ra (of the coating film) of usually not more than 9.5 nm, preferably 2.0 to 8.5 nm, more preferably 2.0 to 7.5 nm; a Young's modulus (relative value to a commercially available video tape: AV T-120 produced by Victor Company of Japan, Limited) of usually not less than 129, preferably not less than 132; and a linear adsorption coefficient (of the coating film) of usually 1.10 to 2.00 $\mu m^{-1}$, preferably 1.20 to 2.00 $\mu m^{-1}$. As to the durability, the running durability of the magnetic recording medium is usually not less than 22 minutes, preferably not less than 24 minutes, more preferably not less than 26 minutes. Also, the scratch resistance of the magnetic recording medium is usually A or B, preferably A, when evaluated into four ranks: A (No scratch), B (A few scratches), C (Many scratches) and D (A great many scratches). In addition, the anti-corrosion property of the magnetic recording medium is not more than 10.0%, preferably not more than 9.5% when represented by a percentage of change in coercive force Hc (%), and not more than 10.0%, preferably not more than 9.5% when represented by a percentage of change in saturation magnetization Bm (%).

Next, there is described a process for producing acicular hematite particles substantially uniformly containing zirconium which is present within the particle according to the present invention.

Firstly, there is described a process for producing acicular goethite particles substantially uniformly containing zirconium which is present within the particle as the starting particles of acicular hematite particles substantially uniformly containing zirconium which is present within the particle according to the present invention.

The acicular goethite particles substantially uniformly containing zirconium which is present within the particle may be produced by causing a zirconium compound to previously exist at amount of 0.04 to 40 mol % (calculated as Zr) based on the mole of Fe, in a suspension containing iron-containing precipitates such as hydroxides or carbonates of iron which can be obtained by reacting a ferrous salt with alkali hydroxide, alkali carbonate or both thereof, before an oxygen-containing gas such as air is passed through the suspension to form the acicular goethite particles, as described hereinafter. More specifically, the zirconium compound may be preliminarily added to any of the aqueous ferrous salt solution, the aqueous alkali hydroxide solution, the aqueous alkali carbonate solution and the iron-containing precipitates. Among them, the addition to the aqueous ferrous salt solution is most preferred.

As the zirconium compound, there may be used zirconium sulfate, zirconium oxy-sulfate, zirconium chloride, zirconium nitrate, zirconium acetate or the like.

The thus obtained acicular goethite particles are particles in which zirconium is substantially uniformly incorporated in a whole portion thereof from a central portion up to a surface portion.

Acicular goethite particles are produced by an ordinary method:

(A) a method of oxidizing a suspension having a pH value of not less than 11 and containing colloidal ferrous hydroxide particles which is obtained by adding not less than an equivalent of an alkali hydroxide solution to an aqueous ferrous salt solution, by passing an oxygen-containing gas thereinto at a temperature of not higher than 80° C.;

(B) a method of producing spindle-shaped goethite particles by oxidizing a suspension containing $FeCO_3$ which is obtained by reacting an aqueous ferrous salt solution with an aqueous alkali carbonate solution, by passing an oxygen-containing gas thereinto after aging the suspension, if necessary;

(C) a method of producing spindle-shaped goethite particles by oxidizing a suspension containing precipitates containing iron which is obtained by reacting an aqueous ferrous salt solution with an aqueous alkali carbonate solution and an alkali hydroxide solution, by passing an oxygen-containing gas thereinto after aging the suspension, if necessary;

(D) a method of growing acicular seed goethite particles by oxidizing a ferrous hydroxide solution containing colloidal ferrous hydroxide particles which is obtained by adding less than an equivalent of an alkali hydroxide solution or an alkali carbonate solution to an aqueous ferrous salt solution, by passing an oxygen-containing gas thereinto, thereby producing acicular seed goethite particles, adding not less than an equivalent of an alkali hydroxide solution to the $Fe^{2+}$ in the aqueous ferrous salt solution, to the aqueous ferrous salt solution containing the acicular goethite seed particles, and passing an oxygen-containing gas into the aqueous ferrous salt solution;

(E) a method of growing acicular seed goethite particles by oxidizing a ferrous hydroxide solution containing colloidal ferrous hydroxide particles which is obtained by adding less than an equivalent of an alkali hydroxide solution or an alkali carbonate solution to an aqueous ferrous salt solution, by passing an oxygen-containing gas thereinto, thereby producing acicular seed goethite particles, adding not less than an equivalent of an aqueous alkali carbonate solution to the $Fe^{2+}$ in the aqueous ferrous salt solution, to the aqueous ferrous salt solution containing the acicular goethite seed particles, and passing an oxygen-containing gas into the aqueous ferrous salt solution; and (F) a method of growing acicular seed goethite particles by oxidizing a ferrous hydroxide solution containing colloidal ferrous hydroxide particles which is obtained by adding less than an equivalent of an alkali hydroxide solution or an alkali carbonate solution to an aqueous ferrous salt solution, by passing an oxygen-containing gas thereinto, thereby producing acicular seed goethite particles and growing the obtained acicular seed goethite particles in an acidic or neutral region.

Elements other than Fe and Zr such as Ni, Zn, P and Si, which are generally added in order to enhance various properties of the particles such as the major axial diameter, the minor axial diameter and the aspect ratio, may be added during the reaction system for producing the goethite particles.

The acicular goethite particles obtained have an average major axial diameter of usually 0.005 to 0.4 $\mu m$, an average minor axial diameter of usually 0.0025 to 0.20 $\mu m$ and a BET specific surface area of about usually 50 to 250 $m^2/g$, and contain soluble sodium salts of usually 300 to 1500 ppm (calculated as Na) and ordinarily soluble sulfates of 100 to 3000 ppm (calculated as $SO_4$).

Next, there is described a process for producing acicular hematite particles substantially uniformly containing zirconium within the particle.

The acicular hematite particles substantially uniformly containing zirconium within the particle may be produced by heat-dehydrating the above-mentioned acicular goethite particles substantially uniformly containing zirconium within the particle.

The temperature of the heat-dehydration is preferably 250 to 850° C. In order to obtain high-density acicular hematite particles substantially uniformly containing zirconium within the particle, the temperature of the heat-dehydration is preferably 550 to 800° C.

Especially, in the case where the heat-dehydration is conducted at an elevated temperature as high as not less than 550° C., it is preferred that the surfaces of the acicular goethite particles be coated with an anti-sintering agent prior to the heat-dehydration, as is well known in the art.

As the sintering preventive, sintering preventives generally used are usable. For example, phosphorus compounds such as sodium hexametaphosphate, polyphospholic acid and orthophosphoric acid, silicon compounds such as #3 water glass, sodium orthosilicate, sodium metasilicate and colloidal silica, boron compounds such as boric acid, aluminum compounds including aluminum salts such as aluminum acetate, aluminum sulfate, aluminum chloride and aluminum nirate, alkali aluminate such as sodium aluminate, and aluminum compounds such as alumina sol and aluminum hydroxide, and titanium compounds such as titanyl sulfate, may be exemplified.

The amount of the anti-sintering agent applied onto the surfaces of the acicular goethite particles is about 0.05 to 10% by weight based on the total weight of the particles, though the amount is varied depending upon kinds of sintering preventives used, pH value of the alkali aqueous solution or various conditions such as heat-treating temperature or the like.

The acicular goethite particles whose surfaces are coated with sintering preventive, may usually contain a soluble sodium salt in an amount of 500 to 2,000 ppm (calculated as Na) and a soluble sulfate in an amount of 300 to 3,000 ppm (calculated as $SO_4$), and have a BET specific surface area value of about 50 to about 250 $m^2/g$. The coating treatment with the sintering preventive may be performed by adding the sintering preventive to a water suspension containing the acicular goethite particles, mixing the suspension while stirring, and then subjecting the suspension to filtration, washing with water and drying.

In order to obtain high-density acicular hematite particles which can successively retain a particle shape of the acicular goethite particles, it is preferred that the acicular goethite particles whose surfaces are preliminarily coated with the sintering preventive, is heat-treated at a temperature as low as 250 to 500° C. to produce low-density acicular hematite particles containing zirconium therewithin, and then the obtained low-density acicular hematite particles is heat-treated at a temperature as high as 550 to 850° C.

If the temperature for heat-treating the goethite particles is less than 250° C., the dehydration reaction takes a long time. On the other hand, if the temperature is not less than 500° C., the dehydration reaction is abruptly brought out, so that it is difficult to retain the shapes because the sintering between particles is caused. The low-density acicular hematite particles obtained by heat-treating the acicular goethite particles at a low temperature are low-density particles having a large number of dehydration pores through which $H_2O$ is removed from the acicular goethite particles and the BET specific surface area thereof is about 1.2 to 2 times larger than that of the acicular goethite particles as the precursor.

The low-density acicular hematite particles have an average major axis diameter of usually 0.005 to 0.30 μm, an average minor axis diameter of usually 0.0025 to 0.15 μm, and a BET specific surface area ($S_{BET}$) of usually about 70 to 350 $m^2/g$, and contain ordinarily soluble sodium salts of usually 500 to 2000 ppm (calculated as Na) and soluble sulfates of usually 300 to 4000 ppm (calculated as $SO_4$).

The low-density acicular hematite particles are then heat-treated at a temperature of usually 550 to 850° C., preferably 550 to 800° C. to obtain a high-density acicular hematite particles. If the heat-treating temperature is less than 550° C., since the densification may be insufficient, a large number of dehydration pores may exist within and on the surface of the acicular hematite particles, so that the dispersion in the vehicle may become insufficient. Further, when the non-magnetic undercoat layer is formed from these particles, it may be difficult to obtain a coating film having a smooth surface. On the other hand, if the temperature exceeds 850° C., although the densification of the acicular hematite particles may be sufficient, since sintering is caused on and between particles, the particle size may increase, so that it may be difficult to obtain a coating film having a smooth surface.

The BET specific surface area of the high-density acicular hematite particles is usually about 35 to 150 $m^2/g$. The high-density acicular hematite particles contain soluble sodium salts of usually 300 to 4000 ppm (calculated as Na) and soluble sulfates of usually 300 to 5000 ppm (calculated as $SO_4$).

The high-density acicular hematite particles which may substantially uniformly contain aluminum within the particle, are diaggregated by a dry-process, and formed into a slurry. The coarse particles thereof contained in the slurry are then deagglomerated by a wet-process. In the wet-deagglomeration, ball mill, sand grinder, colloid mill or the like is used until the coarse particles having a particle size of at least 44 μm are substantially removed. That is, the wet-pulverization is carried out until the amount of the coarse particles having a particle size of not less than 44 μm becomes to usually not more than 10% by weight, preferably not more than 5% by weight, more preferably 0% by weight based on the total weight of the particles. If the amount of the coarse particles having a particle size of not less than 44 μm is more than 10% by weight, the effect of heat-treating the particles in the aqueous alkali solution at the next step is not attained.

The acicular hematite particles according to the present invention can be produced by adding an aqueous alkali solution to a water suspension containing acicular hematite particles so as to adjust the pH value of the water suspension to not less than 13, and then heat-treating the water suspension at usually not less than 80° C., preferably 80 to 103° C., followed by filtering, washing with water and drying.

The concentration of the alkaline suspension containing the acicular hematite particles and having a pH value of 13 is preferably 50 to 250 g/liter.

As the above-mentioned aqueous alkali solution, there may be used aqueous solutions containing alkali hydroxides such as sodium hydroxide, potassium hydroxide, calcium hydroxide or the like.

If the pH value of the aqueous alkali solution containing the acicular hematite particles is less than 13, it is difficult to effectively remove the solid crosslinking caused by the sintering preventive which exists on the surfaces of the acicular hematite particles, so that it is difficult to wash out the soluble sodium salt, soluble sulfate, etc. existing within and on the surfaces of the particles. The upper limit of the pH value is about 14. In consideration of the effect of removing the solid crosslinking caused by the sintering preventive which exists on the surfaces of the acicular hematite particles, the effect of washing out the soluble sodium slat, soluble sulfate, etc., and the effect of removing the alkali which adheres to the surfaces of acicular hematite particles in the process of treatment with the aqueous alkali solution, the preferable pH value is in the range of 13.1 to 13.8.

The heating temperature in the aqueous alkali suspension is preferably 80 to 103° C., more preferably 90 to 100° C. If the temperature is lower than 80° C., it is difficult to effectively remove the solid crosslinking caused by the sintering preventive which exists on the surfaces of the acicular hematite particles. If the heating temperature exceeds 103° C., although it is possible to effectively remove the solid crosslinking, since an autoclave is necessary or the treated solution boils under a normal pressure, it is not advantageous from the point of view of industry.

The acicular hematite particles heat-treated in the aqueous alkali suspension are thereafter filtered out and washed with water by an ordinary method so as to remove the soluble sodium salt and soluble sulfate which are washed out of the interiors and the surfaces of the particles and to remove the alkali adhered to the surfaces of the acicular hematite particles in the process of treatment with the aqueous alkali solution, and then dried.

As the method of washing the acicular hematite particles with water, a method generally industrially used such as a decantation method, a dilution method using a filter thickener and a method of passing water into a filter press is adopted.

If the soluble sodium salt and soluble sulfate which are contained within the acicular hematite particles are washed out with water, even if soluble sodium salt and soluble sulfate adhere to the surfaces when the surfaces of the acicular hematite particles are coated with a coat material, the soluble sodium salt and soluble sulfate can be easily removed by water washing.

The acicular hematite particles according to the present invention, may be coated with at least one compound selected from the group consisting of hydroxides of aluminum, oxides of aluminum, hydroxides of silicon and oxides of silicon after being heat-treated in the aqueous alkali suspension, if required.

In order to coat the acicular hematite particles, an aluminum compound and/or a silicon compound is added to an aqueous suspension containing the acicular hematite particles, and mixed under stirring. After mixing and stirring, the pH value of the mixed solution is adjusted by using an alkali or acid, if necessary. The acicular hematite particles thus coated with at least one selected from the group consisting of a hydroxide of aluminum, an oxide of aluminum, a hydroxide of silicon and an oxide of silicon are then filtered out, washed with water, dried and pulverized. They may be further deaerated and compacted, if necessary.

As the aluminum compound for the coat, the same aluminum compounds as those described above as the sintering preventive are usable.

The amount of aluminum compound added is usually 0.01 to 50% by weight (calculated as Al) based on the total weight of the particles. If the amount is less than 0.01% by weight, the dispersibility-improving effect in the vehicle may be insufficient. On the other hand, if the amount exceeds 50% by weight, the coating dispersibility-improving effect becomes saturated, so that it is meaningless to add an aluminum compound more than necessary.

As the silicon compound, the same silicon compounds as those described above as the sintering preventive are usable.

The amount of silicon compound added is 0.01 to 50% by weight (calculated as $SiO_2$) based on the total weight of the particles. If the amount is less than 0.01% by weight, the dispersibility-improving effect in the vehicle may be insufficient. On the other hand, if the amount exceeds 50% by weight, the coating dispersibility-improving effect becomes saturated, so that it is meaningless to add an silicon compound more than necessary.

When both an aluminum compound and a silicon compound are used, the amount thereof used is preferably 0.01 to 50% by weight (calculated as Al and $SiO_2$) based on the total weight of the particles.

Next, there is described a process for producing the non-magnetic substrate and the magnetic recording medium according to the present invention.

The non-magnetic substrate of the present invention is produced by forming a coating film on the non-magnetic base film and drying the coating film. The coating film is formed by applying a non-magnetic coating composition which contains the acicular hematite particles, a binder resin and a solvent, to the surface of the non-magnetic base film.

As the solvents, there may be used methyl ethyl ketone, toluene, cyclohexanone, methyl isobutyl ketone, tetrahydrofuran, a mixture of these solvents or the like.

The total amount of the solvent used is 50 to 1,000 parts by weight based on 100 parts by weight of the acicular hematite particles. When the amount of the solvent used is less than 50 parts by weight, the viscosity of the non-magnetic coating composition prepared therefrom becomes too high, thereby making it difficult to apply the non-magnetic coating composition. On the other hand, when the amount of the solvent used is more than 1,000 parts by weight, the amount of the solvent volatilized during the formation of the coating film becomes too large, thereby rendering the coating process industrially disadvantageous.

The magnetic recording medium according to the present invention can be produced by applying a magnetic coating composition containing the magnetic acicular metal particles containing iron as a main component, a binder resin and a solvent, on the non-magnetic undercoat layer, followed by drying, to form a magnetic recording layer thereon.

As the solvents, the same solvent as that used for the production of the non-magnetic undercoat layer is usable.

The total amount of the solvent used is 65 to 1,000 parts by weight based on 100 parts by weight of the magnetic acicular metal particles. When the amount of the solvent used is less than 65 parts by weight, the viscosity of the magnetic coating composition prepared therefrom becomes too high, thereby making it difficult to apply the magnetic coating composition. On the other hand, when the amount of the solvent used is more than 1,000 parts by weight, the amount of the solvent volatilized during the formation of the coating film becomes too large, thereby rendering the coating process industrially disadvantageous.

The feature of the present invention lies in such a fact that in the case where the high-density acicular hematite particles containing therewithin zirconium in an amount of 0.05 to 30% by weight (calculated as Zr) based on the total weight of the particles and having an average major axial diameter of not more than 0.3 $\mu$m, a pH value of not less than 8, a soluble sodium salt content of not more than 300 ppm (calculated as Na) and a soluble sulfate content of not more than 150 ppm (calculated as $SO_4$), are used as non-magnetic particles for non-magnetic undercoat layer, the non-magnetic undercoat layer can be improved in surface smoothness and further the substrate can be improved in strength since the acicular hematite particles have an excellent dispersibility in vehicle, and in the case where a magnetic recording layer is formed on the non-magnetic undercoat layer, there can be obtained a magnetic recording medium in which the magnetic recording layer can show a low light transmittance, and which can not only exhibit a smooth surface, a high strength and an excellent durability but also can be effectively prevented from being deteriorated in magnetic properties by inhibiting the corrosion of magnetic acicular metal particles containing iron as a main component which are dispersed in the magnetic recording layer.

Further, another feature of the present invention lies in such a fact that in the case where a magnetic recording layer using the magnetic acicular metal particles containing iron as a main component, which contain aluminum, is formed on the non-magnetic undercoat layer, there can be obtained a magnetic recording medium in which the magnetic recording layer can exhibit a low light transmittance, and which can not only show a high strength, a smooth surface and a more excellent durability but also can be effectively prevented from being deteriorated in magnetic properties by inhibiting the corrosion of magnetic acicular metal particles containing iron as a main component and aluminum which are dispersed in the magnetic recording layer.

The reason why the surface smoothness of the non-magnetic undercoat layer and the strength of the non-magnetic substrate can be improved, is considered as follows. That is, soluble sodium salt or soluble sulfate which cause the high-density acicular hematite particles to be firmly cross-linked and agglomerated together, can be sufficiently removed therefrom by washing with water, so that the acicular hematite particles can be deagglomerated and can be present in the form of substantially independent particles, thereby obtaining acicular hematite particles having an excellent dispersibility in vehicle.

The fact that the acicular hematite particles according to the present invention can show an excellent dispersibility in vehicle, is explained below.

That is, as described above, the acicular goethite particles used as starting particles have been produced by various methods. However, in any method, in the case where ferrous sulfate is used as a main raw material for the production of the acicular goethite particles, a large amount of sulfate $[SO_4^{2-}]$ is necessarily present in a reacted slurry.

In particular, when the goethite particles are produced in an acid solution, water-soluble sulfates such as $Na_2SO_4$ are produced simultaneously, and the reaction slurry contains alkali metals such as $K^+$, $NH_4^+$, $Na^+$ or the like, so that precipitates containing alkali metals or sulfates tend to be formed. The thus-formed precipitates are represented by the formula of $RFe_3(SO_4)(OH)_6$, where R is $K^+$, $NH_4^+$ or $Na^+$. Such precipitates are composed of insoluble sulfur-containing iron salts and, therefore, cannot be removed merely by an ordinary water-washing method. The insoluble salts are converted into soluble sodium salts or soluble sulfates by the subsequent heat-treatment. However, the soluble sodium salts or the soluble sulfates cause the acicular hematite particles to be cross-linked with each other by the action of a sintering preventive which is added as an essential component for preventing the deformation of the acicular hematite particles and the sintering therebetween in the high-temperature treatment for high densification, and are strongly bonded to the inside or the surface of the acicular hematite particles. Thus, the agglomeration of the acicular hematite particles are further accelerated by the soluble sodium salts or the soluble sulfates. As a result, it becomes extremely difficult to remove especially such soluble sodium salts or soluble sulfates enclosed within the particles or the agglomerated particles, by an ordinary water-washing method.

In the case where the acicular goethite particles are produced in an aqueous alkali solution using ferrous sulfate and sodium hydroxide, a sulfate ($Na_2SO_4$) is simultaneously produced, and NaOH is contained in the reacted slurry. Since $Na_2SO_4$ and NaOH both are water-soluble, it is considered that these compounds can be essentially removed by sufficiently washing the acicular goethite particles with water. However, in general, the acicular goethite particles are deteriorated in water-washing efficiency due to a low crystallizability thereof, so that even when the acicular goethite particles are washed with water by an ordinary method, water-soluble components such as soluble sulfates $[SO_4^{2-}]$ or soluble sodium salts $[Na^+]$ still remain in the acicular goethite particles. Further, as described above, these water-soluble components cause the acicular hematite particles to be cross-linked with each other by the action of the sintering preventive, and are strongly bonded to the inside or the surface of the acicular hematite particles, thereby further accelerating the agglomeration of the acicular hematite particles. As a result, it also becomes extremely difficult to remove, especially, such soluble sodium salts or soluble sulfates enclosed within the particles or the agglomerated particles by an ordinary water-washing method.

As described above, it is considered that when the high-density hematite particles containing the soluble sodium salts or the soluble sulfates which are strongly bonded to the inside or the surface of the particles and to the inside of the agglomerated particles through the sintering preventive, are wet-pulverized to deagglomerate coarse particles, then the pH value of the slurry containing the high-density hematite particles is adjusted to not less than 13 and the slurry is heat-treated at not less than 80° C., the aqueous alkali solution can be sufficiently immersed into the high-density hematite particles, so that the bonding force of the sintering preventive strongly bonded to the inside or the surface of the particles and to the inside of the agglomerated particles is gradually weakened, whereby the sintering preventive is released from the inside or the surface of the particles and the inside of the agglomerated particles and simultaneously the water-soluble sodium salts or the water-soluble sulfates tend to be readily removed by washing with water.

The reason why the durability of the magnetic recording medium can be improved, is considered as follows, though it is not clearly determined yet. That is, because of the synergistic effect of using the acicular hematite particles within which zirconium is uniformly contained, as non-magnetic particles, lessening a soluble salt content in the acicular hematite particles, and adjusting a pH value of the acicular hematite particles to the specific range, the resin adsorption of the acicular hematite particles to binder resin in vehicle can be enhanced as described in Examples hereinafter, so that the degree of adhesion between the acicular hematite particles in the non-magnetic undercoat layer and the binder resin, and between the non-magnetic undercoat layer itself and the non-magnetic base film can be increased.

In addition, the reason why the durability of the magnetic recording medium in case of using as the magnetic particles the magnetic acicular metal particles containing iron as a main component, wherein aluminum exists in the particle, is more improved, it is considered that especially because of the synergistic effect of using as magnetic particles, the magnetic acicular metal particles containing iron as a main component and aluminum, the resin adsorption of not only the acicular hematite particles but also the magnetic particles to binder resin in vehicle can be enhanced, so that the degree of adhesion between the acicular hematite particles in the non-magnetic undercoat layer and the binder resin and between the non-magnetic undercoat layer itself and the non-magnetic base film, and the degree of adhesion between the magnetic particles in the magnetic recording layer and the binder resin and between the magnetic recording layer itself and the non-magnetic substrate can be increased.

The reason why the deterioration in magnetic properties can be effectively prevented by inhibiting the corrosion of the magnetic acicular metal particles containing iron as a main component, which are dispersed in the magnetic recording layer, is considered as follows. That is, since the high-density acicular hematite particles contain less amount of soluble components such as soluble sodium salt or soluble sulfate which promote the corrosion of metals, and since the acicular hematite particles have a pH value as high as not less than 8, the corrosion of the magnetic acicular metal particles containing iron as a main component can be effectively prevented from proceeding.

In fact, the present inventors have confirmed that as shown in Examples and Comparative Examples hereinafter, in any of the cases where the high-density acicular hematite particles are wet-pulverized and then heat-treated in an aqueous alkali solution having a pH value of less than 13 at a temperature of not less than 80° C., where the high-density acicular hematite particles are wet-pulverized and then heat-treated in an aqueous alkali solution having a pH value of not less than 13 at a temperature of less than 80° C., and where the high-density acicular hematite particles which are not wet-pulverized and contain coarse particles therein, are heat-treated in an aqueous alkali solution having a pH value of not less than 13 at a temperature of not less than 80° C., the corrosion of the magnetic acicular metal particles containing iron as a main component cannot be effectively prevented from proceeding, and that the corrosion of the magnetic acicular metal particles containing iron as a main component can be prevented from proceeding only by the synergistic effect of less amount of soluble components and the pH value of not less than 8.

As shown in Examples hereinafter, in the case where the acicular hematite particles according to the present invention are used as non-magnetic particles for a non-magnetic undercoat layer, it is possible to obtain a non-magnetic undercoat layer which is excellent in strength (as a substrate) and surface smoothness, because the acicular hematite particles show an excellent dispersibility in vehicle due to the pH value of not less than 8 and less content of soluble salts. In addition, in the case where the non-magnetic undercoat layer is used in magnetic recording medium, the obtained magnetic recording medium can show a low light transmittance, a smooth surface and a high strength. Further, since the acicular hematite particles used as non-magnetic particles for non-magnetic undercoat layer uniformly contain zirconium therewithin, the obtained magnetic recording medium can show an excellent durability. Accordingly, the acicular hematite particles according to the present invention, can be suitably used as non-magnetic particles for a non-magnetic undercoat layer of high-density magnetic recording medium.

As described above, the magnetic recording medium according to the present invention can exhibit a low light transmittance, a smooth surface, a high strength and an excellent durability, and can be prevented from being deteriorated in magnetic properties due to the corrosion of the magnetic acicular particles containing iron as a main component and dispersed in the magnetic recording layer. Therefore, the magnetic recording medium according to the present invention is suitable as a high-density magnetic recording medium.

Especially since the acicular hematite particles uniformly containing zirconium therewithin, are used as non-magnetic particles for non-magnetic undercoat layer and since the magnetic acicular metal particles containing iron as a main component and aluminum are used as magnetic particles for magnetic recording layer, the obtained magnetic recording medium can show a more excellent durability, and, therefore, can be suitably used as high-density magnetic recording medium.

EXAMPLES

The present invention is described in more detail by Examples and Comparative Examples, but the Examples are only illustrative and, therefore, not intended to limit the scope of the present invention.

Various properties were evaluated by the following methods.

(1) The residue on sieve after the wet-pulverization was obtained by measuring the concentration of the slurry after pulverization by a wet-process in advance, and determining the quantity of the solid content on the sieve remaining after the slurry equivalent to 100 g of the particles content was passed through the sieve of 325 meshes (mesh size: 44 $\mu$m).

(2) The average major axis diameter and the average minor axis diameter of the acicular particles are expressed by the average values of 350 particles measured in the photograph obtained by magnifying an electron micrograph (×30000) by 4 times in the vertical and horizontal directions, respectively.

(3) The aspect ratio is the ratio of the average major axis diameter and the average minor axis diameter.

(4) The geometrical standard deviation of the major axis diameter was obtained by the following method.

The major axis diameters of the acicular particles were measured from the magnified electron microphotograph in the above-mentioned (2). The actual major axis diameters of the acicular particles and the number of particles were obtained from the calculation on the basis of the measured values. On logarithmico-normal probability paper, the major axis diameters were plotted at regular intervals on the abscissa-axis and the accumulative number of particles belonging to each interval of the major axis diameters was plotted by percentage on the ordinate-axis by a statistical technique. The major axis diameters corresponding to the number of particles of 50% and 84.13%, were read from the graph, and each geometrical standard deviation was measured from the following formulae:

> Geometrical standard deviation of the major axis diameter={major axis diameter ($\mu$m) corresponding to 84.13% under integration sieve}/{major axis diameter (geometrical average diameter) corresponding to 50% under integration sieve}.

The more the geometrical standard deviation nears 1.0, the more excellent the particle size distribution of the major axis diameters of the particles.

(5) The specific surface area is expressed by the value measured by a BET method.

(6) The degree of densification of the particles is represented by $S_{BET}/S_{TEM}$ value as described above.

$S_{BET}$ is a specific surface area measured by the above-described BET method. $S_{TEM}$ is a value calculated from the average major axis diameter (d cm) and the average minor axis diameter (w cm) measured from the electron microphotograph described in (2) on the assumption that a particle is a rectangular parallellopiped in accordance with the following formula:

$$S_{TEM}(m^2/g) = \{(4 \cdot d \cdot w + 2w^2)/(d \cdot w^2 \cdot \rho_p)\} \times 10^{-4}$$

wherein $\rho_p$ is the true specific gravity of the hematite particles, and 5.2 g/cm$^3$ was used.

(7) The content of each of Zr, Al, Si, P, Nd and B in and/or on the particle was measured according to JIS K0119 using "fluorescent X-ray spectroscopy device 3063 M" (manufactured by Rigaku Denki Kogyo Co., Ltd.).

(8) The pH value of the particles was measured as follows.

5 g of a sample was weighed and placed in a 300-ml conical flask. 100 ml of boiling pure water was added into the flask and the contents thereof were heated and maintained in a boiling condition for about 5 minutes. Thereafter, the flask was plugged and allowed to stand for cooling up to an ordinary temperature. After boiling pure water was added in such an amount corresponding to the weight loss and the flask was plugged again, the contents of the flask were shaken and mixed for one minute and then allowed to stand for 5 minutes, thereby obtaining a supernatant. The pH value of the thus obtained supernatant was measured according to JIS Z 8802-7, and the pH value of the particles was expressed by the measured value.

(9) The content of soluble sodium salts and the content of soluble sulfates were determined by filtering the supernatant prepared for the above measurement of the pH value of the particles using a filter paper No. 5C, and measuring amounts of $Na^+$ and $SO_4^{2-}$ in the filtrate by an inductively coupled plasma atomic emission spectrometry device (manufactured by Seiko Denshi Kogyo Co., Ltd.).

(10) The resin adsorptivity of the particles represents the degree at which a resin is adsorbed to the particles. The closer to 100% the value obtained in the following manner, the firmer the resin adsorptivity to the particles surfaces in the vehicle and the more favorable.

The resin adsorptivity Wa was first obtained. 20 g of particles and 56 g of a mixed solvent (27.0 g of methyl ethyl ketone, 16.2 g of toluene, and 10.8 g of cyclohexanone) with 2 g of a vinyl chloride-vinyl acetate copolymer having a sodium sulfonate group dissolved therein were charged into a 100-ml polyethylene bottle together with 120 g of 3 mm$\phi$ steel beads. The particles and the solvent were mixed and dispersed by a paint shaker for 60 minutes.

Thereafter, 50 g of the coating composition was taken out, and charged into a 50-ml settling cylinder. The solid content was separated from the solvent portion by the centrifugalization at a rate of 10000 rpm for 15 minutes. The concentration of the solid resin content contained in the solvent portion was determined by a gravimetric method and the resin content existing in the solid portion was determined by deducting the obtained resin content from the amount of the resin charged as the resin adsorptivity Wa (mg/g) to the particles.

The total quantity of separated solid content was taken into a 100 ml-tall beaker, and 50 g of a mixed solvent (25.0 g of methyl ethyl ketone, 15.0 g of toluene, and 10.0 g of cyclohexanone) was added thereto. The obtained mixture was to ultrasonic dispersion for 15 minutes, and the thus-obtained suspension was charged into a 50-ml settling cylinder. The solid content was separated from the solvent portion by centrifuging them at a rate of 10000 rpm for 15 minutes. The concentration of the solid resin content contained in the solvent portion was measured so as to determine the resin content dissolved from the resin which had been adsorbed to the particle surfaces into the solvent phase.

The process from the step of taking the solid content into the 100 ml-tall beaker to the determination of the resin content dissolved into the solvent phase was repeated twice. The total quantity We (mg/g) of resin content dissolved into the solvent phase in the three cycles was obtained, and the value calculated in accordance with the following formula is expressed as the resin adsorptivity T(%):

$$T(\%)=[(Wa-We)/Wa]\times 100.$$

(11) The viscosity of the coating composition was obtained by measuring the viscosity of the coating composition at 25° C. at a shear rate D of 1.92 sec$^{-1}$ by using "E type viscometer EMD-R" (manufactured by Tokyo Keiki, Co., Ltd.).

(12) The gloss of the surface of the coating film of each of the non-magnetic undercoat layer and the magnetic coating layer was measured at an angle of incidence of 45° by "glossmeter UGV-5D" (manufactured by Suga Shikenki, Co., Ltd.).

(13) The surface roughness Ra is expressed by the average value of the center-line average roughness of the profile curve of the surface of the coating film by using "Surfcom-575A" (manufactured by Tokyo Seimitsu Co., Ltd.).

(14) The durability of the magnetic medium was evaluated by the following running durability and the scratch resistance.

(i) The running durability was evaluated by the actual operating time under the conditions that the load was 200 gw and the relative speed of the head and the tape was 16 m/s by using "Media Durability Tester MDT-3000" (manufactured by Steinberg Associates). The longer the actual operating time, the higher the running durability.

(ii) The scratch resistance was evaluated by observing through the microscope the surface of the magnetic tape after running and visually judging the degree of scratching. Evaluation was divided into the following four ranks.

A: No scratch
B: A few scratches
C: Many scratches
D: A great many scratches

(15) The strength of the coating film was expressed the Young's modulus obtained by "Autograph" (produced by Shimazu Seisakusho Co., Ltd.). The Young's modulus was expressed by the ratio of the Young's modulus of the coating film to that of a commercially available video tape "AV T-120" (produce by Victor Company of Japan, Limited). The higher the relative value, the more favorable.

(16) The magnetic properties of the magnetic acicular metal particles and magnetic recording medium were measured under an external magnetic field of 10 kOe by "Vibration Sample Magnetometer VSM-3S-15 (manufactured by Toei Kogyo, Co., Ltd.)".

(17) The change with the passage of time in magnetic properties of the magnetic recording medium due to the corrosion of the magnetic acicular metal particles containing iron as a main component, which are dispersed in the magnetic coating film, was determined as follows.

The magnetic recording medium was allowed to stand at a temperature of 60° C. and a relative humidity of 90% for 14 days. The coercive force values and the saturation magnetization values of the magnetic recording medium before and after the keeping test were measured, and the difference between the measured values before and after the keeping test was divided by the value before the keeping test, thereby obtaining an amount of change in each magnetic property which was expressed by a percentage.

(18) The light transmittance is expressed by the linear adsorption coefficient calculated by substituting the light transmittance measured by using "UV-Vis Recording Spectrophotometer UV-2100" (manufactured by Shimazu Seisakusho, Ltd.) for the following formula. The larger the value, the more difficult it is for the magnetic recording medium to transmit light:

Linear adsorption coefficient $(\mu m^{-1})=\{1\ n\ (1/t)\}/FT$ wherein t represents a light transmittance (−) at $\lambda=900$ nm, and FT represents thickness ($\mu m$) of the coating film used for the measurement.

(19) The thickness of each of the non-magnetic base film, the non-magnetic undercoat layer and the magnetic coating film constituting the magnetic recording medium was measured in the following manner by using "Digital Electronic Micrometer R351C" (manufactured by Anritsu Corp.)

The thickness (A) of a non-magnetic base film was first measured. Similarly, the thickness (B) (B=the sum of the thicknesses of the non-magnetic base film and the non-magnetic undercoat layer) of a non-magnetic substrate obtained by forming a non-magnetic undercoat layer on the base film was measured. Furthermore, the thickness (C) (C=the sum of the thicknesses of the non-magnetic base film, the non-magnetic undercoat layer and the magnetic recording layer) of a magnetic recording medium obtained by forming a magnetic recording layer on the non-magnetic substrata was measured. The thickness of the non-magnetic undercoat layer is expressed by (B)–(A), and the thickness of the magnetic recording layer is expressed by (C)–(B).

Example 1
<Production of Spindle-shaped Hematite Particles>

1200 g of spindle-shaped goethite particles containing 2.65% by weight of zirconium (calculated as Zr) based on the total weight of the particles, uniformly within the particles (average major axial diameter: 0.189 μm, average minor axial diameter: 0.0207 μm, aspect ratio: 9.1:1, BET specific surface area: 141.3 m$^2$/g, geometrical standard deviation: 1.33, content of soluble sodium salts: 1380 ppm (calculated as Na), content of soluble sulfate: 821 ppm (calculated as SO$_4$), pH value: 5.9), which were obtained from an aqueous ferrous sulfate solution, an aqueous zirconium oxysulfate solution and an aqueous sodium carbonate solution by the afore-mentioned method (B), were suspended in water so as to obtain a slurry, and the concentration of the solid content was adjusted to 8 g/liter. 150 liter of the slurry was heated to 60° C. and the pH value of the slurry was adjusted to 10.0 by adding a 0.1-N aqueous sodium hydroxide solution.

To the alkali slurry was gradually added 30 g of #3 water glass as a sintering preventive, and after the end of addition, the resultant mixture was aged for 60 minutes. The pH value of the slurry was then adjusted to 6.0 by adding a 0.1-N acetic acid solution. Thereafter, the particles were filtered out, washed with water, dried and pulverized by an ordinary method, thereby producing spindle-shaped goethite particles coated with an oxide of silicon. The silicon content was 0.69% by weight (calculated as SiO$_2$) based on the total weight of the particles.

1000 g of the spindle-shaped goethite particles obtained were charged into a stainless steel rotary furnace, and heat-dehydrated in the air at 340° C. for 30 minutes while rotating the furnace, to obtain low-density spindle-shaped hematite particles. The thus obtained low-density spindle-shaped hematite particles containing zirconium had an average major axis diameter of 0.151 μm, an average minor axis diameter of 0.0198 μm, an aspect ratio of 7.6:1, a geometrical standard deviation of major axis diameter of 1.34, a BET specific surface area of 159.8 m$^2$/g and a $S_{BET}/S_{TEM}$ value of 3.86. The content of soluble sodium salt of the low-density spindle-shaped hematite particles was 2123 ppm (calculated as Na) and the content of soluble sulfate was 1016 ppm (calculated as SO$_4$). The Zr content of the low-density spindle-shaped hematite particles was 2.81% by weight (calculated as Zr) based on the total weight of the particles, the silicon content of the low-density spindle-shaped hematite particles was 0.75% by weight (calculated as SiO$_2$) based on the total weight of the particles, and the pH value of the low-density spindle-shaped hematite particles was 5.7.

850 g of the low-density spindle-shaped hematite particles were then charged into a ceramic rotary furnace, and heat-treated in the air at 650° C. for 30 minutes while rotating the furnace so as to fill in dehydration pores. The resultant high-density spindle-shaped hematite particles had an average major axis diameter of 0.150 μm, an average minor axis diameter of 0.0200 μm, an aspect ratio of 7.5:1, a geometrical standard deviation of major axis diameter of 1.34, a BET specific surface area ($S_{BET}$) of 51.6 m$^2$/g and a $S_{BET}/S_{TEM}$ value of 1.26. The content of soluble sodium salt of the high-density spindle-shaped hematite particles was 3104 ppm (calculated as Na) and the content of soluble sulfate was 2656 ppm (calculated as SO$_4$). The pH value of the high-density spindle-shaped hematite particles was 5.1. The Zr content of the high-density spindle-shaped hematite particles was 2.81% by weight (calculated as Zr) based on the total weight of the particles, and the silicon content of the high-density spindle-shaped hematite particles was 0.75% by weight (calculated as SiO$_2$) based on the total weight of the particles. The resin adsorptivity was 54.5%

After 800 g of the high-density spindle-shaped hematite particles obtained were roughly pulverized by a Nara mill in advance, the obtained high-density spindle-shaped hematite particles were charged into 4.7 liter of pure water and deagglomerated by a homomixer (manufactured by Tokushu-kika Kogyo, CO., Ltd.) for 60 minutes.

The slurry of the high-density spindle-shaped hematite particles obtained was then dispersed for 3 hours at an axial rotation frequency of 2000 rpm while being circulated by a horizontal SGM (Dispermat SL, manufactured by S. C. Adichem, CO., Ltd.). The high-density spindle-shaped hematite particles in the slurry remaining on a sieve of 325 meshes (mesh size: 44 μm) was 0% by weight.

The concentration of the high-density spindle-shaped hematite particles in the slurry was adjusted to 100 g/liter, and 7 liter of the slurry was adjusted to pH value 13.5 by adding a 6N-aqueous sodium hydroxide solution. The resulting slurry was then heated to 95° C. under stirring, and was held for 3 hours at 95° C.

The resultant slurry was then washed with water by a decantation method and the pH value of the slurry was adjusted to 10.5. The concentration of the slurry at this point was 98 g/liter.

The high-density spindle-shaped hematite particles were filtered out from 2 liter of the obtained slurry through a Buchner filter, and the purified water was passed into the filtrate until the electric conductivity of the filtrate became not more than 30 μs. The high-density spindle-shaped hematite particles were then dried by an ordinary method and pulverized to obtain the target high-density spindle-shaped hematite particles containing uniformly zirconium in the particle. The high-density spindle-shaped hematite particles obtained had an average major axial diameter of not more than 0.150 μm, a minor axial diameter of 0.0199 μm, and a specific ratio of 7.5:1. The geometric standard deviation of major axial diameter was 1.34, the BET specific surface ($S_{BET}$) was 50.9 m$^2$/g, the $S_{BET}/S_{TEM}$ value was 1.23. The content of soluble sodium salt of the high-density spindle-shaped hematite particles was 96 ppm (calculated as Na) and the content of soluble sulfate was 21 ppm (calculated as SO$_4$). The pH value of the high-density spindle-shaped hematite particles was 9.3. The Zr content of the high-density spindle-shaped hematite particles was 2.81% by weight (calculated as Zr) based on the total weight of the particles and the resin adsorptivity of the high-density spindle-shaped hematite particles was 76.5%.

Example 2
<Production of Non-magnetic Substrate: Formation of Non-magnetic Undercoat Layer on Non-magnetic Base Film>

12 g of the high-density spindle-shaped hematite particles containing uniformly zirconium of 2.81% by weight (calculated as Zr) in the particle, which were obtained in Example 1 were mixed with a binder resin solution (30% by weight of vinyl chloride-vinyl acetate copolymer resin having a sodium sulfonate group and 70% by weight of cyclohexanone) and cyclohexanone, and each of the obtained mixtures (solid content: 72% by weight) was kneaded by a plast-mill for 30 minutes.

Each of the thus-obtained kneaded material was charged into a 140 ml-glass bottle together with 95 g of 1.5 mm$\phi$ glass beads, a binder resin solution (30% by weight of polyurethane resin having a sodium sulfonate group and 70% by weight of a solvent (methyl ethyl ketone:toluene=1:1)), cyclohexanone, methyl ethyl ketone and toluene, and the obtained mixture was mixed and dispersed by a paint shaker for 6 hours to obtain a non-magnetic coating composition. The viscosity of the obtained coating film composition was 402 cP.

The thus-obtained non-magnetic coating composition containing the high-density spindle-shaped hematite particles was as follows:

| | |
|---|---|
| High-density spindle-shaped hematite particles | 100 parts by weight |
| Vinyl chloride-vinyl acetate copolymer resin having a sodium sulfonate group | 10 parts by weight |
| Polyurethane resin having a sodium sulfonate group | 10 parts by weight |
| Cyclohexanone | 44.6 parts by weight |
| Methylethyl ketone | 111.4 parts by weight |
| Toluene | 66.9 parts by weight |

The non-magnetic coating composition obtained was applied to a polyethylene terephthalate film of 12 $\mu$m thick to a thickness of 55 $\mu$m by an applicator, and the coating film was then dried, thereby forming a non-magnetic undercoat layer. The thickness of the non-magnetic undercoat layer was 3.5 $\mu$m.

The non-magnetic undercoat layer produced from the high-density spindle-shaped hematite particles as the non-magnetic particles had a gloss of 207%, and a surface roughness Ra of 6.3 nm. The Young's modulus (relative value) thereof was 130.

Example 3
<Production of Magnetic Recording Medium: Formation of Magnetic Recording Layer>

12 g of magnetic acicular metal particles containing iron as a main component (average major axis diameter: 0.153 $\mu$m, average minor axis diameter: 0.0212 $\mu$m, aspect ratio: 7.2:1, coercive force value: 1866 Oe, saturation magnetization value: 130.6 emu/g), 1.2 g of a polishing agent (AKP-30: trade name, produced by Sumitomo Chemical Co., Ltd.), 0.36 g of carbon black (#3250B, trade name, produced by Mitsubishi Chemical Corp.), a binder resin solution (30% by weight of vinyl chloride-vinyl acetate copolymer resin having a sodium sulfonate group and 70% by weight of cyclohexanone) and cyclohexanone were mixed to obtain a mixture (solid content: 78% by weight). The mixture was further kneaded by a plast-mill for 30 minutes to obtain a kneaded material.

The thus-obtained kneaded material was charged into a 140 ml-glass bottle together with 95 g of 1.5 mm$\phi$ glass beads, a binder resin solution (30% by weight of polyurethane resin having a sodium sulfonate group and 70% by weight of a solvent (methyl ethyl ketone:toluene=1:1)), cyclohexanone, methyl ethyl ketone and toluene, and the mixture was mixed and dispersed by a paint shaker for 6 hours. Then, the lubricant and hardening agent were added to the mixture, and the resultant mixture was mixed and dispersed by a paint shaker for 15 minutes.

The thus-obtained magnetic coating composition was as follows:

| | |
|---|---|
| Magnetic acicular metal particles containing iron as a main component | 100 parts by weight |
| Vinyl chloride-vinyl acetate copolymer resin having a sodium sulfonate group | 10 parts by weight |
| Polyurethane resin having a sodium sulfonate group | 10 parts by weight |
| Polishing agent (AKP-30) | 10 parts by weight |
| Carbon black (#3250B) | 3.0 parts by weight |
| Lubricant (myristic acid: butyl stearate = 1:2) | 3.0 parts by weight |
| Hardening agent (polyisocyanate) | 5.0 parts by weight |
| Cyclohexanone | 65.8 parts by weight |
| Methyl ethyl ketone | 164.5 parts by weight |
| Toluene | 98.7 parts by weight |

The magnetic coating composition obtained was applied to the non-magnetic undercoat layer to a thickness of 15 $\mu$m by an applicator, and the magnetic recording medium obtained was oriented and dried in a magnetic field, and then calendered. The magnetic recording medium was then subjected to a curing reaction at 60° C. for 24 hours, and thereafter slit into a width of 0.5 inch, thereby obtaining a magnetic tape. The thickness of the respective magnetic recording layer was 1.0 $\mu$m.

The coercive force Hc of the magnetic tape produced by forming a magnetic recording layer on the non-magnetic undercoat layer was 1961 Oe, the squareness (Br/Bm) thereof was 0.87, the gloss thereof was 231%, the surface roughness Ra thereof was 6.2 nm, the Young's modulus (relative value) thereof was 134, the linear absorption coefficient thereof was 1.26 $\mu m^{-1}$. The running durability thereof was 28.8 minutes, and the scratch resistance thereof was A.

The percentages of change in coercive force and saturation magnetization which represent an anti-corrosion property of the magnetic tape, were 4.6% and 4.8%, respectively.

Example 4
<Production of Magnetic Recording Medium: Formation of Magnetic Recording Layer>

The same procedure as defined in Example 3 was conducted except that the magnetic acicular metal particles were changed to magnetic acicular metal particles wherein aluminum was present in and on the particle (average major axis diameter: 0.110 $\mu$m, average minor axis diameter: 0.0146 $\mu$m, aspect ratio: 7.5:1, a geometric standard deviation of major axis diameter of 1.36, resin adsorptivity: 82.2%, coercive force: 1911 Oe, saturation magnetization: 136.5 emu/g, aluminum content of 3.03% by weight (calculated as Al) based on the total weight of the particles (1.26% by weight, calculated as Al, of aluminum in the central portion, 0.81% by weight, calculated as Al, of aluminum in the surface layer portion, and 0.96% by weight, calculated as Al, of aluminum on the surface coating), Nd content of 0.56% by weight (calculated as Nd) based on the total weight of the particles, thereby producing a magnetic tape.

The thickness of the magnetic coating film was 1.1 $\mu$m.

The thus obtained magnetic tape had a coercive force Hc of 1983 Oe, a squareness (Br/Bm) of 0.88, a gloss of 228%, a surface roughness Ra of 6.1 nm, a Young's modulus (relative value) of coating film of 132, a linear absorption coefficient of 1.24 $\mu m^{-1}$, a running durability of not less than 30 minutes and a scratch resistance of A.

The percentages of change in coercive force and saturation magnetization which represent an anti-corrosion property of the magnetic tape, were 3.1% and 2.7%, respectively.

<Kinds of Acicular Goethite Particles>
Starting Particles 1 to 6

Various properties of acicular goethite particles as a starting particles of acicular hematite particles are shown in Table 1.

Examples 5 to 13 and Comparative Examples 1 to 13

<Production of Low-density Acicular Hematite Particles>

Low-density acicular hematite particles were obtained in the same way as in Example 1 except for varying the kind of acicular goethite particles as a starting particles, the kind and amount added of sintering preventive, and heat-dehydration temperature and time. Incidentally, the particles obtained in Comparative Example 4 were acicular goethite particles.

The main producing conditions and various properties are shown in Tables 2 to 5.

Examples 14 to 22 and Comparative Examples 14 to 25

<Production of High-density Acicular Hematite Particles>

High-density acicular hematite particles were obtained in the same way as in Example 1 except for varying the kind of low-density acicular hematite particles, and heat-treating temperature and time for high densification.

The main producing conditions and various properties are shown in Tables 6 to 7.

Examples 23 to 31 and Comparative Examples 26 to 32

<Heat-treatment of Acicular Hematite Particles in Alkaline Suspension>

The same procedure as defined in Example 1 was conducted except that whether or not the wet-pulverization process was conduced, whether or not the heat-treatment in the aqueous alkali solution was conducted, kind of acicular hematite particles, pH value of slurry, heating temperature and heating time were varied, thereby obtaining acicular hematite particles.

Main production conditions and various properties are shown in Tables 8 and 11.

Example 32

<Surface-coating Treatment of Acicular Hematite Particles>

The concentration of the slurry having a pH value of 10.5 which was obtained in Example 23 by washing the slurry with water by a decantation method, after being heat-treated in the alkaline suspension, was 98 g/liter. 5 liters of the water-washed slurry was heated again to 60° C., and then mixed with 572 ml of a 1.0N sodium aluminate aqueous solution (corresponding to 1.5% by weight calculated as Al based on the weight of the spindle-shaped hematite particles). After maintaining the slurry at that temperature for 30 minutes, the pH value of the slurry was adjusted to 8.5 using an aqueous acetic acid solution. Next, the slurry was sequentially subjected to filtration, washing with water, drying and pulverization in the same manner as in Example 1, thereby obtaining spindle-shaped hematite particles whose surfaces were coated with a hydroxide of aluminum.

Main production conditions and various properties are shown in Tables 12 and 13.

Examples 33 to 40

Acicular hematite particles coated with a coat material by an ordinary method were obtained in the same way as in Example 32 except for varying the kind of acicular hematite particles and the kind and amount of the coat material.

The main producing conditions and various properties are shown in Tables 12 and 13, respectively.

Examples 41 to 58, Comparative Examples 33 to 46

<Production of Non-magnetic Substrate: Formation of Non-magnetic Undercoat Layer on Non-magnetic Base Film>

By using the acicular hematite particles obtained in Example 23 to 40, starting particles 5, Comparative Examples 3, 14 to 17, 22, 26 to 32, non-magnetic undercoat layers were formed in the same way as in Example 2.

The main producing conditions and various properties are shown in Tables 14 and 15, respectively.

<Production of Magnetic Recording Medium: Formation of Magnetic Coating Film>

Magnetic acicular metal particles containing iron as a main component used for forming the magnetic recording layers and various properties thereof are shown in Table 16.

Examples 59 to 76, Comparative Examples 47 to 60

<Production of Magnetic Recording Medium: Formation of Magnetic Coating Film>

Magnetic recording media were produced in the same way as in Example 3 except for varying the kind of non-magnetic substrate obtained in Examples 41 to 58 and Comparative Examples 33 to 46 and the kind of magnetic acicular metal particles.

The main producing conditions and various properties are shown in Tables 17 and 18.

Examples 77 to 94, Comparative Examples 61 to 74

Magnetic recording media were produced in the same way as in Example 3 except for varying the kind of non-magnetic substrate and the kind of magnetic acicular metal particles.

The main producing conditions and various properties are shown in Tables 19 and 20.

TABLE 1

| Kind of starting particles | Production of acicular goethite particles | |
|---|---|---|
| | Production process | Kind of zirconium compound added |
| Starting particles 1 | (B) | Zirconium oxysulfate |
| Starting particles 2 | (D) | Zirconium oxysulfate |
| Starting particles 3 | (F) | Zirconium oxysulfate |
| Starting particles 4 | (A) | Zirconium oxysulfate |
| Starting particles 5 | (C) | Zirconium oxysulfate |

TABLE 1-continued

Properties of acicular goethite particles

| Kind of starting particles | Average major axial diameter (μm) | Average minor axial diameter (μm) | Aspect ratio (–) |
|---|---|---|---|
| Starting particles 1 | 0.155 | 0.0193 | 8.0:1 |
| Starting particles 2 | 0.168 | 0.0200 | 8.4:1 |
| Starting particles 3 | 0.126 | 0.0166 | 7.6:1 |
| Starting particles 4 | 0.199 | 0.0231 | 8.6:1 |
| Starting particles 5 | 0.265 | 0.0306 | 8.7:1 |

Properties of acicular goethite particles

| Kind of starting particles | Geometrical standard deviation (–) | BET specific surface area (m²/g) | Zr content (wt. %) |
|---|---|---|---|
| Starting particles 1 | 1.32 | 180.6 | 1.83 |
| Starting particles 2 | 1.33 | 158.1 | 0.64 |
| Starting particles 3 | 1.37 | 198.2 | 2.12 |
| Starting particles 4 | 1.40 | 81.2 | 3.64 |
| Starting particles 5 | 1.40 | 71.6 | — |

Properties of acicular goethite particles

| Kind of starting particles | Soluble sodium salt (ppm) | Soluble sulfate (ppm) | pH value (–) |
|---|---|---|---|
| Starting particles 1 | 615 | 513 | 6.3 |
| Starting particles 2 | 512 | 664 | 6.2 |
| Starting particles 3 | 1,060 | 1,701 | 5.1 |
| Starting particles 4 | 2,012 | 865 | 7.9 |
| Starting particles 5 | 516 | 612 | 6.5 |

TABLE 2

| Examples | Kind of acicular goethite particles | Anti-sintering treatment Kind | Calculated as | Amount added (wt. %) |
|---|---|---|---|---|
| Example 5 | Particles obtained in Example 1 | Sodium hexa-metaphosphate | P | 1.5 |
| Example 6 | Starting particles A | Water glass #3 | SiO₂ | 1.5 |
| Example 7 | Starting particles A | Water glass #3 Phosphoric acid | SiO₂ P | 1.0 1.0 |
| Example 8 | Starting particles B | Water glass #3 | SiO₂ | 3.0 |
| Example 9 | Starting particles B | Water glass #3 | SiO₂ | 2.0 |
| Example 10 | Starting particles C | Phosphoric acid | P | 3.0 |
| Example 11 | Starting particles C | Boric acid | B | 0.5 |
| Example 12 | Starting particles D | Water glass #3 | SiO₂ | 2.5 |
| Example 13 | Starting particles D | Water glass #3 Sodium hexa-metaphosphate | SiO₂ P | 1.0 0.5 |

Heat-dehydration

| Examples | Temperature (° C.) | Time (min) |
|---|---|---|
| Example 5 | 340 | 30 |
| Example 6 | 320 | 30 |
| Example 7 | 340 | 30 |
| Example 8 | 310 | 75 |
| Example 9 | 330 | 60 |
| Example 10 | 340 | 30 |
| Example 11 | 340 | 30 |
| Example 12 | 300 | 90 |
| Example 13 | 360 | 15 |

TABLE 3

| Comparative Examples | Kind of starting particles | Anti-sintering treatment Kind | Calculated as | Amount added (wt. %) |
|---|---|---|---|---|
| Comparative Example 1 | Starting particles E | — | — | — |
| Comparative Example 2 | Starting particles E | — | — | — |
| Comparative Example 3 | Starting particles E | Water glass #3 | SiO₂ | 1.5 |
| Comparative Example 4 | Starting particles E | Phosphoric acid | P | 1.0 |
| Comparative Example 5 | Starting particles E | Colloidal silica | SiO₂ | 1.5 |
| Comparative Example 6 | Starting particles E | Phosphoric acid | P | 1.5 |
| Comparative Example 7 | Starting particles E | Water glass #3 | SiO₂ | 2.0 |
| Comparative Example 8 | Starting particles E | Water glass #3 | SiO₂ | 1.0 |
| Comparative Example 9 | Starting particles E | Phosphoric acid | P | 1.0 |
| Comparative Example 10 | Particles obtained in Example 1 | Sodium hexa-metaphosphate | P | 1.0 |
| Comparative Example 11 | Particles obtained in Example 1 | Water glass #3 | SiO₂ | 1.5 |
| Comparative Example 12 | Particles obtained in Example 1 | Boric acid | B | 0.5 |
| Comparative Example 13 | Particles obtained in Example 1 | Water glass #3 | SiO₂ | 1.0 |
| Comparative Example 14 | Particles obtained in Example 1 | Phosphoric acid | P | 1.0 |

Heat-dehydration

| Comparative Examples | Temperature (° C.) | Time (min) |
|---|---|---|
| Comparative Example 1 | 340 | 60 |
| Comparative Example 2 | 340 | 30 |
| Comparative Example 3 | 330 | 60 |
| Comparative Example 4 | — | — |

TABLE 3-continued

|  |  |  |
|---|---|---|
| Comparative Example 5 | 340 | 30 |
| Comparative Example 6 | 320 | 60 |
| Comparative Example 7 | 310 | 60 |
| Comparative Example 8 | 300 | 90 |
| Comparative Example 9 | 340 | 30 |
| Comparative Example 10 | 350 | 15 |
| Comparative Example 11 | 330 | 30 |
| Comparative Example 12 | 340 | 30 |
| Comparative Example 13 | 330 | 30 |
| Comparative Example 14 | 310 | 90 |

TABLE 4

Properties of low-density acicular hematite particles

| Examples | Average major axial diameter (μm) | Average minor axial diameter (μm) | Geometrical standard deviation (-) |
|---|---|---|---|
| Example 5 | 0.151 | 0.0197 | 1.34 |
| Example 6 | 0.138 | 0.0180 | 1.34 |
| Example 7 | 0.139 | 0.0182 | 1.35 |
| Example 8 | 0.152 | 0.0189 | 1.35 |
| Example 9 | 0.149 | 0.0187 | 1.35 |
| Example 10 | 0.118 | 0.0168 | 1.37 |
| Example 11 | 0.117 | 0.0167 | 1.37 |
| Example 12 | 0.176 | 0.0228 | 1.41 |
| Example 13 | 0.175 | 0.0227 | 1.40 |

Properties of low-density acicular hematite particles

| Examples | Aspect ratio (-) | $S_{BET}$ (m²/g) | $S_{TEM}$ (m²/g) | $S_{BET}/S_{TEM}$ value (-) |
|---|---|---|---|---|
| Example 5 | 7.7:1 | 155.3 | 41.6 | 3.73 |
| Example 6 | 7.7:1 | 201.4 | 45.5 | 4.42 |
| Example 7 | 7.6:1 | 215.8 | 45.0 | 4.79 |
| Example 8 | 8.0:1 | 176.1 | 43.2 | 4.07 |
| Example 9 | 8.0:1 | 170.6 | 43.7 | 3.90 |
| Example 10 | 7.0:1 | 218.6 | 49.0 | 4.46 |
| Example 11 | 7.0:1 | 207.3 | 49.3 | 4.20 |
| Example 12 | 7.7:1 | 135.8 | 35.9 | 3.78 |
| Example 13 | 7.7:1 | 131.1 | 36.1 | 3.63 |

Properties of low-density acicular hematite particles

| Examples | Zr content (wt. %) | Amount of sintering preventive Calculated as | Amount of sintering preventive Content (wt %) |
|---|---|---|---|
| Example 5 | 2.81 | P | 1.23 |
| Example 6 | 2.01 | SiO₂ | 1.38 |
| Example 7 | 2.01 | SiO₂ | 0.94 |
|  |  | P | 0.96 |
| Example 8 | 0.70 | SiO₂ | 2.61 |
| Example 9 | 0.71 | SiO₂ | 1.87 |
| Example 10 | 2.34 | P | 2.78 |
| Example 11 | 2.31 | B | 0.88 |
| Example 12 | 4.00 | SiO₂ | 2.18 |
| Example 13 | 3.96 | SiO₂ | 0.88 |
|  |  | P | 0.45 |

Properties of low-density acicular hematite particles

| Examples | Soluble sodium salt (ppm) | Soluble sulfate (ppm) | pH value (-) |
|---|---|---|---|
| Example 5 | 1,960 | 997 | 6.1 |
| Example 6 | 1,382 | 713 | 6.3 |
| Example 7 | 1,456 | 816 | 5.8 |
| Example 8 | 1,873 | 896 | 6.4 |
| Example 9 | 1,716 | 1,121 | 6.1 |
| Example 10 | 2,326 | 2,326 | 7.1 |
| Example 11 | 2,121 | 2,615 | 7.3 |
| Example 12 | 1,280 | 968 | 6.1 |
| Example 13 | 1,683 | 796 | 5.6 |

TABLE 5

Properties of low-density acicular hematite particles

| Comparative Examples | Average major axial diameter (μm) | Average minor axial diameter (μm) | Geometrical standard deviation (-) |
|---|---|---|---|
| Comparative Example 1 | 0.236 | 0.0315 | 1.40 |
| Comparative Example 2 | 0.235 | 0.0314 | 1.41 |
| Comparative Example 3 | 0.236 | 0.0286 | 1.41 |
| Comparative Example 4 | — | — | — |
| Comparative Example 5 | 0.238 | 0.0309 | 1.41 |
| Comparative Example 6 | 0.236 | 0.0311 | 1.40 |
| Comparative Example 7 | 0.237 | 0.0311 | 1.40 |
| Comparative Example 8 | 0.235 | 0.0312 | 1.41 |
| Comparative Example 9 | 0.236 | 0.0296 | 1.40 |
| Comparative Example 10 | 0.151 | 0.0200 | 1.35 |
| Comparative Example 11 | 0.151 | 0.0198 | 1.35 |
| Comparative Example 12 | 0.152 | 0.0198 | 1.35 |
| Comparative Example 13 | 0.151 | 0.0199 | 1.35 |

Properties of low-density acicular hematite particles

| Comparative Examples | Aspect ratio (-) | $S_{BET}$ (m²/g) | $S_{TEM}$ (m²/g) | $S_{BET}/S_{TEM}$ value (-) |
|---|---|---|---|---|
| Comparative Example 1 | 7.5:1 | 80.1 | 26.0 | 3.07 |
| Comparative Example 2 | 7.5:1 | 84.2 | 26.1 | 3.22 |
| Comparative Example 3 | 8.3:1 | 118.2 | 28.5 | 4.14 |
| Comparative Example 4 | — | — | — | — |
| Comparative Example 5 | 7.7:1 | 117.2 | 26.5 | 4.42 |

TABLE 5-continued

| Comparative Example | | | | |
|---|---|---|---|---|
| Comparative Example 6 | 7.6:1 | 123.6 | 26.4 | 4.69 |
| Comparative Example 7 | 7.6:1 | 111.1 | 26.4 | 4.22 |
| Comparative Example 8 | 7.5:1 | 120.6 | 26.3 | 4.59 |
| Comparative Example 9 | 8.0:1 | 106.5 | 27.6 | 3.86 |
| Comparative Example 10 | 7.6:1 | 141.6 | 41.0 | 3.45 |
| Comparative Example 11 | 7.6:1 | 148.3 | 41.4 | 3.58 |
| Comparative Example 12 | 7.7:1 | 126.5 | 41.4 | 3.06 |
| Comparative Example 13 | 7.6:1 | 151.6 | 41.2 | 3.68 |

Properties of low-density acicular hematite particles

| Comparative Examples | Zr content (wt. %) | Amount of sintering preventive Calculated as | Content (wt. %) |
|---|---|---|---|
| Comparative Example 1 | 0.00 | — | — |
| Comparative Example 2 | 0.00 | — | — |
| Comparative Example 3 | 0.00 | $SiO_2$ | 1.33 |
| Comparative Example 4 | — | — | — |
| Comparative Example 5 | 0.00 | $SiO_2$ | 1.41 |
| Comparative Example 6 | 0.00 | P | 1.36 |
| Comparative Example 7 | 0.00 | $SiO_2$ | 1.86 |
| Comparative Example 8 | 0.00 | $SiO_2$ | 0.85 |
| Comparative Example 9 | 0.00 | P | 0.81 |
| Comparative Example 10 | 2.81 | P | 0.91 |
| Comparative Example 11 | 2.81 | $SiO_2$ | 1.32 |
| Comparative Example 12 | 2.81 | B | 0.23 |
| Comparative Example 13 | 2.82 | P | 0.85 |

Properties of low-density acicular hematite particles

| Comparative Examples | Soluble sodium salt (ppm) | Soluble sulfate (ppm) | pH value (–) | Resin adsorption T (%) |
|---|---|---|---|---|
| Comparative Example 1 | 712 | 682 | 5.8 | 47.1 |
| Comparative Example 2 | 832 | 632 | 6.1 | — |
| Comparative Example 3 | 1,216 | 713 | 6.6 | 54.1 |
| Comparative Example 4 | — | — | — | — |
| Comparative Example 5 | 1,368 | 686 | 6.8 | — |
| Comparative Example 6 | 1,412 | 652 | 7.0 | — |
| Comparative Example 7 | 1,365 | 690 | 6.8 | — |
| Comparative Example 8 | 1,478 | 781 | 6.4 | — |
| Comparative Example 9 | 1,202 | 760 | 6.4 | — |
| Comparative Example 10 | 1,731 | 582 | 6.8 | — |
| Comparative Example 11 | 1,813 | 583 | 7.5 | — |
| Comparative Example 12 | 1,845 | 812 | 6.9 | — |
| Comparative Example 13 | 1,801 | 690 | 6.8 | — |

TABLE 6

| Examples | Kind of low-density acicular hematite particles | Heat treatment for high densification Temperature (° C.) | Time (min) |
|---|---|---|---|
| Example 14 | Example 5 | 650 | 60 |
| Example 15 | Example 6 | 660 | 30 |
| Example 16 | Example 7 | 620 | 45 |
| Example 17 | Example 8 | 680 | 30 |
| Example 18 | Example 9 | 710 | 30 |
| Example 19 | Example 10 | 730 | 30 |
| Example 20 | Example 11 | 730 | 30 |
| Example 21 | Example 12 | 680 | 45 |
| Example 22 | Example 13 | 650 | 45 |

Properties of high-density acicular hematite particles

| Examples | Average major axial diameter (μm) | Average minor axial diameter (μm) | Geometrical standard deviation (–) |
|---|---|---|---|
| Example 14 | 0.150 | 0.0198 | 1.34 |
| Example 15 | 0.136 | 0.0181 | 1.34 |
| Example 16 | 0.138 | 0.0181 | 1.35 |
| Example 17 | 0.150 | 0.0189 | 1.36 |
| Example 18 | 0.147 | 0.0188 | 1.35 |
| Example 19 | 0.116 | 0.0168 | 1.37 |
| Example 20 | 0.115 | 0.0168 | 1.38 |
| Example 21 | 0.173 | 0.0229 | 1.40 |
| Example 22 | 0.174 | 0.0228 | 1.41 |

Properties of high-density acicular hematite particles

| Examples | Aspect ratio (–) | $S_{BET}$ ($m^2$/g) | $S_{TEM}$ ($m^2$/g) | $S_{BET}/S_{TEM}$ value (–) |
|---|---|---|---|---|
| Example 14 | 7.6:1 | 51.2 | 41.4 | 1.24 |
| Example 15 | 7.5:1 | 56.1 | 45.3 | 1.24 |
| Example 16 | 7.6:1 | 58.2 | 45.3 | 1.29 |
| Example 17 | 7.9:1 | 50.6 | 43.3 | 1.17 |
| Example 18 | 7.8:1 | 52.3 | 43.5 | 1.20 |
| Example 19 | 6.9:1 | 61.3 | 49.1 | 1.25 |
| Example 20 | 6.8:1 | 63.6 | 49.1 | 1.29 |
| Example 21 | 7.6:1 | 44.1 | 35.8 | 1.23 |
| Example 22 | 7.6:1 | 43.8 | 35.9 | 1.22 |

Properties of high-density acicular hematite particles

| Examples | Zr content (wt. %) | Amount of sintering preventive Calculated as | Content (wt. %) |
|---|---|---|---|
| Example 14 | 2.81 | P | 1.23 |
| Example 15 | 2.01 | $SiO_2$ | 1.38 |
| Example 16 | 2.01 | $SiO_2$ | 0.94 |
| | | P | 0.96 |
| Example 17 | 0.70 | $SiO_2$ | 2.61 |

TABLE 6-continued

| Example 18 | 0.70 | $SiO_2$ | 1.87 |
| Example 19 | 2.34 | P | 2.78 |
| Example 20 | 2.32 | B | 0.88 |
| Example 21 | 3.98 | $SiO_2$ | 2.18 |
| Example 22 | 3.95 | $SiO_2$ | 0.88 |
|  |  | P | 0.45 |

Properties of high-density acicular hematite particles

| Examples | Soluble sodium salt (ppm) | Soluble sulfate (ppm) | pH value (−) |
|---|---|---|---|
| Example 14 | 2,721 | 2,512 | 5.1 |
| Example 15 | 1,816 | 2,913 | 5.2 |
| Example 16 | 1,821 | 2,872 | 5.0 |
| Example 17 | 2,863 | 3,703 | 5.0 |
| Example 18 | 2,662 | 3,265 | 4.8 |
| Example 19 | 3,803 | 3,913 | 6.1 |
| Example 20 | 3,156 | 3,865 | 6.3 |
| Example 21 | 1,528 | 2,263 | 4.8 |
| Example 22 | 1,588 | 2,562 | 5.1 |

TABLE 7

| Comparative Examples | Kind of low-density acicular hematite particles | Heat treatment for high densification | |
|---|---|---|---|
| | | Temperature (°C.) | Time (min) |
| Comparative Example 14 | Starting particles 5 | 710 | 60 |
| Comparative Example 15 | Comparative Example 2 | 720 | 60 |
| Comparative Example 16 | Comparative Example 4 | 680 | 60 |
| Comparative Example 17 | Comparative Example 5 | 720 | 30 |
| Comparative Example 18 | Comparative Example 6 | 550 | 60 |
| Comparative Example 19 | Comparative Example 7 | 730 | 30 |
| Comparative Example 20 | Comparative Example 8 | 650 | 60 |
| Comparative Example 21 | Comparative Example 9 | 580 | 60 |
| Comparative Example 22 | Comparative Example 10 | 700 | 30 |
| Comparative Example 23 | Comparative Example 11 | 650 | 60 |
| Comparative Example 24 | Comparative Example 12 | 630 | 60 |
| Comparative Example 25 | Comparative Example 13 | 450 | 60 |

Properties of high-density acicular hematite particles

| Comparative Examples | Average major axial diameter (μm) | Average minor axial diameter (μm) | Geometrical standard deviation (−) |
|---|---|---|---|
| Comparative Example 14 | 0.141 | 0.0391 | 1.89 |
| Comparative Example 15 | 0.183 | 0.0380 | 1.65 |
| Comparative Example 16 | 0.221 | 0.0346 | 1.56 |
| Comparative Example 17 | 0.246 | 0.0319 | 1.48 |
| Comparative Example 18 | 0.243 | 0.0314 | 1.42 |
| Comparative Example 19 | 0.243 | 0.0311 | 1.40 |
| Comparative Example 20 | 0.241 | 0.0312 | 1.41 |
| Comparative Example 21 | 0.242 | 0.0313 | 1.41 |
| Comparative Example 22 | 0.151 | 0.0200 | 1.35 |
| Comparative Example 23 | 0.152 | 0.0201 | 1.36 |
| Comparative Example 24 | 0.151 | 0.0199 | 1.35 |
| Comparative Example 25 | 0.151 | 0.0199 | 1.36 |

Properties of high-density acicular hematite particles

| Comparative Examples | Aspect ratio (−) | $S_{BET}$ ($m^2/g$) | $S_{TEM}$ ($m^2/g$) | $S_{BET}/S_{TEM}$ value (−) |
|---|---|---|---|---|
| Comparative Example 14 | 3.6:1 | 13.1 | 22.4 | 0.58 |
| Comparative Example 15 | 4.8:1 | 16.8 | 22.3 | 0.75 |
| Comparative Example 16 | 6.4:1 | 21.2 | 24.0 | 0.88 |
| Comparative Example 17 | 7.7:1 | 29.8 | 25.7 | 1.16 |
| Comparative Example 18 | 7.7:1 | 46.5 | 26.1 | 1.78 |
| Comparative Example 19 | 7.8:1 | 37.1 | 26.3 | 1.41 |
| Comparative Example 20 | 7.7:1 | 39.3 | 26.3 | 1.50 |
| Comparative Example 21 | 7.7:1 | 47.0 | 26.2 | 1.80 |
| Comparative Example 22 | 7.6:1 | 50.6 | 41.0 | 1.23 |
| Comparative Example 23 | 7.6:1 | 49.8 | 40.8 | 1.22 |
| Comparative Example 24 | 7.6:1 | 46.8 | 41.2 | 1.14 |
| Comparative Example 25 | 7.6:1 | 90.6 | 41.2 | 2.20 |

Properties of high-density acicular hematite particles

| Comparative Examples | Zr content (wt. %) | Amount of sintering preventive | |
|---|---|---|---|
| | | Calculated as | Content (wt. %) |
| Comparative Example 14 | 0.00 | — | — |
| Comparative Example 15 | 0.00 | — | — |
| Comparative Example 16 | 0.00 | P | 0.85 |
| Comparative Example 17 | 0.00 | $SiO_2$ | 1.40 |
| Comparative Example 18 | 0.00 | P | 1.35 |
| Comparative Example 19 | 0.00 | $SiO_2$ | 1.85 |
| Comparative Example 20 | 0.00 | $SiO_2$ | 0.84 |
| Comparative Example 21 | 0.00 | P | 0.81 |
| Comparative Example 22 | 2.81 | P | 0.90 |
| Comparative Example 23 | 2.81 | $SiO_2$ | 1.30 |

TABLE 7-continued

| Comparative Examples | | | |
|---|---|---|---|
| Comparative Example 24 | 2.81 | B | 0.21 |
| Comparative Example 25 | 2.81 | P | 0.83 |

| | Properties of high-density acicular hematite particles | | | |
|---|---|---|---|---|
| Comparative Examples | Soluble sodium salt (ppm) | Soluble sulfate (ppm) | pH value (−) | Resin adsorption T (%) |
| Comparative Example 14 | 1,713 | 2,870 | 5.1 | 33.6 |
| Comparative Example 15 | 1,682 | 2,462 | 5.3 | 41.2 |
| Comparative Example 16 | 1,681 | 2,865 | 5.4 | 47.6 |
| Comparative Example 17 | 1,881 | 2,655 | 5.5 | 54.9 |
| Comparative Example 18 | 1,765 | 2,762 | 5.4 | — |
| Comparative Example 19 | 1,890 | 2,662 | 5.5 | — |
| Comparative Example 20 | 1,886 | 2,321 | 5.1 | — |
| Comparative Example 21 | 1,813 | 2,965 | 5.0 | — |
| Comparative Example 22 | 2,916 | 2,612 | 5.6 | 57.8 |
| Comparative Example 23 | 3,003 | 2,730 | 5.7 | — |
| Comparative Example 24 | 3,682 | 2,613 | 5.6 | — |
| Comparative Example 25 | 2,865 | 2,801 | 5.5 | — |

TABLE 8

| | Kind of high-density acicular hematite particles | Wet-pulverization | |
|---|---|---|---|
| Examples | | Use or non-use | Residue on sieve (wt. %) |
| Example 23 | Example 14 | used | 0 |
| Example 24 | Example 15 | used | 0 |
| Example 25 | Example 16 | used | 0 |
| Example 26 | Example 17 | used | 0 |
| Example 27 | Example 18 | used | 0 |
| Example 28 | Example 19 | used | 0 |
| Example 29 | Example 20 | used | 0 |
| Example 30 | Example 21 | used | 0 |
| Example 31 | Example 22 | used | 0 |

| | Heat-treatment in aqueous alkali solution | | | |
|---|---|---|---|---|
| Examples | Use or non-use | pH value (−) | Temperature (° C.) | Time (Min) |
| Example 23 | used | 13.5 | 95 | 180 |
| Example 24 | used | 13.7 | 90 | 180 |
| Example 25 | used | 13.8 | 95 | 180 |
| Example 26 | used | 13.2 | 96 | 210 |
| Example 27 | used | 13.3 | 98 | 180 |
| Example 28 | used | 13.6 | 93 | 120 |
| Example 29 | used | 13.1 | 93 | 180 |
| Example 30 | used | 13.8 | 98 | 120 |
| Example 31 | used | 13.5 | 95 | 120 |

TABLE 9

| | Kind of high-density acicular hematite particles | Wet-pulverization | |
|---|---|---|---|
| Examples | | Use or non-use | Residue on sieve (wt. %) |
| Comparative Example 26 | Comparative Example 18 | used | 0 |
| Comparative Example 27 | Comparative Example 19 | used | 0 |
| Comparative Example 28 | Comparative Example 20 | used | 0 |
| Comparative Example 29 | Comparative Example 21 | non-used | 21.6 |
| Comparative Example 30 | Comparative Example 23 | non-used | 41.2 |
| Comparative Example 31 | Comparative Example 24 | non-used | 38.6 |
| Comparative Example 32 | Comparative Example 25 | used | 0 |

| | Heat-treatment in aqueous alkali solution | | | |
|---|---|---|---|---|
| Comparative Examples | Use or non-use | pH value (−) | Temperature (° C.) | Time (Min) |
| Comparative Example 26 | non-used | — | — | — |
| Comparative Example 27 | used | 12.0 | 90 | 120 |
| Comparative Example 28 | used | 13.1 | 45 | 120 |
| Comparative Example 29 | used | 13.1 | 91 | 120 |
| Comparative Example 30 | used | 9.6 | 90 | 120 |
| Comparative Example 31 | used | 13.2 | 90 | 120 |
| Comparative Example 32 | used | 9.0 | 90 | 180 |

TABLE 10

| | Properties of acicular hematite particles washed with water after aqueous alkali solution treatment | | |
|---|---|---|---|
| Examples | Average major axial diameter (μm) | Average minor axial diameter (μm) | Geometrical standard deviation (−) |
| Example 23 | 0.150 | 0.0198 | 1.34 |
| Example 24 | 0.136 | 0.0181 | 1.34 |
| Example 25 | 0.137 | 0.0181 | 1.35 |
| Example 26 | 0.150 | 0.0188 | 1.36 |
| Example 27 | 0.149 | 0.0188 | 1.35 |
| Example 28 | 0.116 | 0.0168 | 1.37 |
| Example 29 | 0.116 | 0.0168 | 1.38 |
| Example 30 | 0.173 | 0.0229 | 1.40 |
| Example 31 | 0.173 | 0.0229 | 1.40 |

| | Properties of acicular hematite particles washed with water after aqueous alkali solution treatment | | | |
|---|---|---|---|---|
| Examples | Aspect ratio (−) | $S_{BET}$ ($m^2/g$) | $S_{TEM}$ ($m^2/g$) | $S_{BET}/S_{TEM}$ value (−) |
| Example 23 | 7.6:1 | 53.1 | 41.4 | 1.28 |
| Example 24 | 7.5:1 | 57.1 | 45.3 | 1.26 |
| Example 25 | 7.6:1 | 58.6 | 45.3 | 1.29 |
| Example 26 | 8.0:1 | 50.6 | 43.5 | 1.16 |
| Example 27 | 7.9:1 | 53.0 | 43.5 | 1.22 |

TABLE 10-continued

| Example 28 | 6.9:1 | 60.8 | 49.1 | 1.24 |
| Example 29 | 6.9:1 | 62.5 | 49.1 | 1.27 |
| Example 30 | 7.6:1 | 44.6 | 35.8 | 1.25 |
| Example 31 | 7.6:1 | 44.8 | 35.8 | 1.25 |

Properties of acicular hematite particles washed with water after aqueous alkali solution treatment

| | Amount of sintering preventive | | |
| --- | --- | --- | --- |
| Examples | Zr content (wt. %) | Calculated as | Content (wt. %) |
| Example 23 | 2.82 | P | 0.48 |
| Example 24 | 2.01 | $SiO_2$ | 1.23 |
| Example 25 | 2.02 | $SiO_2$ | 0.76 |
| | | P | 0.32 |
| Example 26 | 0.71 | $SiO_2$ | 2.16 |
| Example 27 | 0.71 | $SiO_2$ | 1.23 |
| Example 28 | 2.35 | P | 0.84 |
| Example 29 | 2.34 | B | 0.13 |
| Example 30 | 4.00 | $SiO_2$ | 1.78 |
| Example 31 | 3.98 | $SiO_2$ | 0.44 |
| | | P | 0.19 |

Properties of acicular hematite particles washed with water after aqueous alkali solution treatment

| Examples | Soluble sodium salt (ppm) | Soluble sulfate (ppm) | pH value (−) | Resin adsorption T (%) |
| --- | --- | --- | --- | --- |
| Example 23 | 71 | 12 | 9.0 | 83.6 |
| Example 24 | 53 | 3 | 9.1 | 82.9 |
| Example 25 | 63 | 5 | 9.2 | 85.6 |
| Example 26 | 112 | 12 | 9.6 | 90.6 |
| Example 27 | 96 | 21 | 9.3 | 88.2 |
| Example 28 | 81 | 36 | 8.9 | 82.6 |
| Example 29 | 75 | 10 | 9.1 | 84.2 |
| Example 30 | 36 | 6 | 9.0 | 81.9 |
| Example 31 | 58 | 12 | 9.3 | 87.0 |

TABLE 11

Properties of acicular hematite particles washed with water after aqueous alkali solution treatment

| Comparative Examples | Average major axial diameter (μm) | Average minor axial diameter (μm) | Geometrical standard deviation (−) |
| --- | --- | --- | --- |
| Comparative Example 26 | 0.243 | 0.0314 | 1.42 |
| Comparative Example 27 | 0.243 | 0.0311 | 1.40 |
| Comparative Example 28 | 0.241 | 0.0312 | 1.41 |
| Comparative Example 29 | 0.242 | 0.0313 | 1.41 |
| Comparative Example 30 | 0.151 | 0.0201 | 1.36 |
| Comparative Example 31 | 0.151 | 0.0200 | 1.35 |
| Comparative Example 32 | 0.151 | 0.0199 | 1.36 |

Properties of acicular hematite particles washed with water after aqueous alkali solution treatment

| Comparative Examples | Aspect ratio (−) | $S_{BET}$ ($m^2/g$) | $S_{TEM}$ ($m^2/g$) | $S_{BET}/S_{TEM}$ value (−) |
| --- | --- | --- | --- | --- |
| Comparative Example 26 | 7.7:1 | 47.5 | 26.1 | 1.82 |
| Comparative Example 27 | 7.8:1 | 37.3 | 26.3 | 1.42 |
| Comparative Example 28 | 7.7:1 | 40.1 | 26.3 | 1.53 |
| Comparative Example 29 | 7.7:1 | 43.5 | 26.2 | 1.66 |
| Comparative Example 30 | 7.5:1 | 50.1 | 40.8 | 1.23 |
| Comparative Example 31 | 7.6:1 | 47.8 | 41.0 | 1.17 |
| Comparative Example 32 | 7.6:1 | 89.6 | 41.2 | 2.17 |

Properties of acicular hematite particles washed with water after aqueous alkali solution treatment

| | Amount of sintering preventive | | |
| --- | --- | --- | --- |
| Comparative Examples | Zr content (wt. %) | Calculated as | Content (wt. %) |
| Comparative Example 26 | 0.00 | P | 1.35 |
| Comparative Example 27 | 0.00 | $SiO_2$ | 1.85 |
| Comparative Example 28 | 0.00 | $SiO_2$ | 0.80 |
| Comparative Example 29 | 0.00 | P | 0.68 |
| Comparative Example 30 | 2.81 | $SiO_2$ | 1.30 |
| Comparative Example 31 | 2.81 | B | 0.15 |
| Comparative Example 32 | 2.81 | P | 0.83 |

Properties of acicular hematite particles washed with water after aqueous alkali solution treatment

| Comparative Examples | Soluble sodium salt (ppm) | Soluble sulfate (ppm) | pH value (−) | Resin adsorption T (%) |
| --- | --- | --- | --- | --- |
| Comparative Example 26 | 786 | 436 | 6.8 | 38.1 |
| Comparative Example 27 | 582 | 388 | 7.0 | 46.5 |
| Comparative Example 28 | 363 | 216 | 7.6 | 53.2 |
| Comparative Example 29 | 396 | 221 | 7.2 | 41.6 |
| Comparative Example 30 | 413 | 231 | 7.3 | 58.2 |
| Comparative Example 31 | 356 | 210 | 7.6 | 58.9 |
| Comparative Example 32 | 560 | 268 | 7.6 | 51.3 |

TABLE 12

| Examples | Kind of acicular hematite particles subjected to aqueous alkali solution treatment | Surface treatment Kind of surface-treating material | Amount added (wt %) |
|---|---|---|---|
| Example 32 | Example 23 | Sodium aluminate | 1.5 |
| Example 33 | Example 24 | Water glass #3 | 0.5 |
| Example 34 | Example 25 | Sodium aluminate | 3.0 |
| Example 35 | Example 26 | Colloidal silica | 1.0 |
| Example 36 | Example 27 | Aluminum acetate | 1.0 |
|  |  | Water glass #3 | 1.0 |
| Example 37 | Example 28 | Sodium aluminate | 5.0 |
|  |  | Colloidal silica | 0.5 |
| Example 38 | Example 29 | Sodium aluminate | 10.0 |
| Example 39 | Example 30 | Aluminum acetate | 0.5 |
|  |  | Colloidal silica | 1.0 |
| Example 40 | Example 31 | Sodium aluminate | 0.1 |

| Examples | Coating material Kind* | Calculated as | Coating amount (wt. %) |
|---|---|---|---|
| Example 32 | A | Al | 1.48 |
| Example 33 | S | $SiO_2$ | 0.50 |
| Example 34 | A | Al | 2.92 |
| Example 35 | S | $SiO_2$ | 0.97 |
| Example 36 | A | Al | 0.96 |
|  | S | $SiO_2$ | 0.96 |
| Example 37 | A | Al | 4.71 |
|  | S | $SiO_2$ | 0.48 |
| Example 38 | A | Al | 9.03 |
| Example 39 | A | Al | 0.48 |
|  | S | $SiO_2$ | 0.97 |
| Example 40 | A | Al | 0.10 |

Note *: "A" represents hydroxide of aluminum. "S" represents oxide of silicon.

TABLE 13

Properties of acicular hematite particles washed with water after surface-treatment

| Examples | Average major axial diameter (μm) | Average minor axial diameter (μm) | Geometrical standard deviation (-) |
|---|---|---|---|
| Example 32 | 0.150 | 0.0198 | 1.34 |
| Example 33 | 0.136 | 0.0181 | 1.34 |
| Example 34 | 0.137 | 0.0181 | 1.35 |
| Example 35 | 0.150 | 0.0188 | 1.36 |
| Example 36 | 0.149 | 0.0188 | 1.35 |
| Example 37 | 0.116 | 0.0169 | 1.37 |
| Example 38 | 0.116 | 0.0168 | 1.37 |
| Example 39 | 0.173 | 0.0230 | 1.40 |
| Example 40 | 0.173 | 0.0229 | 1.40 |

Properties of acicular hematite particles washed with water after surface-treatment

| Examples | Aspect ratio (-) | $S_{BET}$ ($m^2/g$) | $S_{TEM}$ ($m^2/g$) | $S_{BET}/S_{TEM}$ value (-) |
|---|---|---|---|---|
| Example 32 | 7.6:1 | 54.6 | 41.4 | 1.32 |
| Example 33 | 7.5:1 | 57.1 | 45.3 | 1.26 |
| Example 34 | 7.6:1 | 58.8 | 45.3 | 1.30 |
| Example 35 | 8.0:1 | 51.0 | 43.5 | 1.17 |
| Example 36 | 7.9:1 | 52.5 | 43.5 | 1.21 |
| Example 37 | 6.9:1 | 60.6 | 48.8 | 1.24 |
| Example 38 | 6.9:1 | 65.8 | 49.1 | 1.34 |
| Example 39 | 7.5:1 | 43.1 | 35.7 | 1.21 |
| Example 40 | 7.6:1 | 43.7 | 35.8 | 1.22 |

Properties of acicular hematite particles washed with water after surface-treatment

| Examples | Zr content (wt. %) | Amount of sintering preventive Calculated as | Content (wt. %) |
|---|---|---|---|
| Example 32 | 2.81 | P | 0.48 |
| Example 33 | 2.01 | $SiO_2$ | 1.20 |
| Example 34 | 2.03 | $SiO_2$ | 0.76 |
|  |  | P | 0.31 |
| Example 35 | 0.73 | $SiO_2$ | 2.08 |
| Example 36 | 0.71 | $SiO_2$ | 1.21 |
| Example 37 | 2.36 | P | 0.76 |
| Example 38 | 2.35 | B | 0.04 |
| Example 39 | 3.99 | $SiO_2$ | 1.66 |
| Example 40 | 3.99 | $SiO_2$ | 0.41 |
|  |  | P | 0.12 |

Properties of acicular hematite particles washed with water after surface treatment

| Examples | Soluble sodium salt (ppm) | Soluble sulfate (ppm) | pH value (-) | Resin adsorption T (%) |
|---|---|---|---|---|
| Example 32 | 38 | 3 | 9.0 | 89.1 |
| Example 33 | 41 | 6 | 9.0 | 89.3 |
| Example 34 | 56 | 5 | 9.2 | 88.9 |
| Example 35 | 71 | 2 | 9.1 | 93.2 |
| Example 36 | 96 | 8 | 9.3 | 89.9 |
| Example 37 | 32 | 4 | 9.3 | 91.2 |
| Example 38 | 83 | 6 | 9.0 | 89.9 |
| Example 39 | 10 | 9 | 9.0 | 87.6 |
| Example 40 | 8 | 6 | 9.1 | 91.6 |

TABLE 14

| Examples | Production of non-magnetic coating composition Kind of acicular hematite particles | Weight ratio of particles to resin (-) | Properties of non-magnetic coating composition Viscosity (cP) |
|---|---|---|---|
| Example 41 | Example 23 | 5.0 | 384 |
| Example 42 | Example 24 | 5.0 | 333 |
| Example 43 | Example 25 | 5.0 | 410 |
| Example 44 | Example 26 | 5.0 | 282 |
| Example 45 | Example 27 | 5.0 | 384 |
| Example 46 | Example 28 | 5.0 | 410 |
| Example 47 | Example 29 | 5.0 | 435 |
| Example 48 | Example 30 | 5.0 | 512 |
| Example 49 | Example 31 | 5.0 | 333 |
| Example 50 | Example 32 | 5.0 | 333 |
| Example 51 | Example 33 | 5.0 | 282 |
| Example 52 | Example 34 | 5.0 | 410 |
| Example 53 | Example 35 | 5.0 | 435 |
| Example 54 | Example 36 | 5.0 | 333 |
| Example 55 | Example 37 | 5.0 | 461 |
| Example 56 | Example 38 | 5.0 | 486 |
| Example 57 | Example 39 | 5.0 | 282 |
| Example 58 | Example 40 | 5.0 | 310 |

TABLE 14-continued

| | Properties of non-magnetic undercoat layer | | | |
|---|---|---|---|---|
| Examples | Thickness (μm) | Gloss (%) | Surface roughness Ra (nm) | Young's modulus (relative value) |
| Example 41 | 3.4 | 206 | 6.4 | 131 |
| Example 42 | 3.4 | 208 | 6.4 | 125 |
| Example 43 | 3.5 | 211 | 6.4 | 125 |
| Example 44 | 3.5 | 215 | 6.2 | 132 |
| Example 45 | 3.4 | 210 | 6.8 | 133 |
| Example 46 | 3.3 | 214 | 6.4 | 120 |
| Example 47 | 3.6 | 216 | 6.0 | 120 |
| Example 48 | 3.5 | 213 | 6.3 | 134 |
| Example 49 | 3.4 | 210 | 6.5 | 133 |
| Example 50 | 3.4 | 210 | 6.6 | 129 |
| Example 51 | 3.5 | 215 | 6.3 | 127 |
| Example 52 | 3.5 | 220 | 5.8 | 128 |
| Example 53 | 3.5 | 223 | 5.8 | 132 |
| Example 54 | 3.4 | 218 | 6.3 | 131 |
| Example 55 | 3.6 | 216 | 6.2 | 125 |
| Example 56 | 3.2 | 218 | 6.1 | 124 |
| Example 57 | 3.5 | 208 | 6.6 | 136 |
| Example 58 | 3.5 | 209 | 6.5 | 137 |

TABLE 15

| | Production of non-magnetic coating composition | | Properties of non-magnetic |
|---|---|---|---|
| Comparative Examples | Kind of acicular hematite particles | Weight ratio of particles to resin (–) | coating composition Viscosity (cP) |
| Comparative Example 33 | Starting particles 5 | 5.0 | 10,830 |
| Comparative Example 34 | Comparative Example 14 | 5.0 | 102 |
| Comparative Example 35 | Comparative Example 15 | 5.0 | 128 |
| Comparative Example 36 | Comparative Example 3 | 5.0 | 14,570 |
| Comparative Example 37 | Comparative Example 16 | 5.0 | 282 |
| Comparative Example 38 | Comparative Example 17 | 5.0 | 410 |
| Comparative Example 39 | Comparative Example 26 | 5.0 | 1,920 |
| Comparative Example 40 | Comparative Example 27 | 5.0 | 435 |
| Comparative Example 41 | Comparative Example 28 | 5.0 | 512 |
| Comparative Example 42 | Comparative Example 29 | 5.0 | 640 |
| Comparative Example 43 | Comparative Example 22 | 5.0 | 538 |
| Comparative Example 44 | Comparative Example 30 | 5.0 | 410 |
| Comparative Example 45 | Comparative Example 31 | 5.0 | 793 |
| Comparative Example 46 | Comparative Example 32 | 5.0 | 2,050 |

| | Properties of non-magnetic undercoat layer | | | |
|---|---|---|---|---|
| Comparative Examples | Thickness (μm) | Gloss (%) | Surface roughness Ra (nm) | Young's modulus (relative value) |
| Comparative Example 33 | 3.8 | 43 | 99.6 | 97 |
| Comparative Example 34 | 3.4 | 52 | 78.2 | 98 |
| Comparative Example 35 | 3.3 | 72 | 51.2 | 103 |
| Comparative Example 36 | 3.7 | 78 | 39.8 | 96 |
| Comparative Example 37 | 3.5 | 143 | 29.8 | 115 |
| Comparative Example 38 | 3.5 | 151 | 23.2 | 108 |
| Comparative Example 39 | 3.5 | 173 | 16.6 | 112 |
| Comparative Example 40 | 3.5 | 178 | 13.2 | 115 |
| Comparative Example 41 | 3.5 | 176 | 14.8 | 118 |
| Comparative Example 42 | 3.4 | 158 | 20.0 | 110 |
| Comparative Example 43 | 3.3 | 169 | 19.6 | 95 |
| Comparative Example 44 | 3.5 | 185 | 12.1 | 111 |
| Comparative Example 45 | 3.6 | 187 | 10.0 | 112 |
| Comparative Example 46 | 3.5 | 143 | 30.0 | 105 |

TABLE 16

| | Properties of magnetic acicular metal particles containing iron as main component | | |
|---|---|---|---|
| Kind of magnetic particles | Average major axial diameter (μm) | Average minor axial diameter (μm) | Geometrical standard deviation σg (–) |
| Magnetic metal particles (a) | 0.110 | 0.0150 | 1.36 |
| Magnetic metal particles (b) | 0.098 | 0.0134 | 1.35 |
| Magnetic metal particles (c) | 0.101 | 0.0144 | 1.38 |
| Magnetic metal particles (d) | 0.125 | 0.0184 | 1.35 |
| Magnetic metal particles (e) | 0.153 | 0.0212 | 1.35 |
| Magnetic metal particles (f) | 0.181 | 0.0231 | 1.38 |

| | Properties of magnetic acicular metal particles containing iron as inain component | | |
|---|---|---|---|
| Kind of magnetic particles | Aspect ratio (–) | Coercive force (Hc) (Oe) | Saturation magnetization (emu/g) |
| Magnetic metal particles (a) | 7.3:1 | 1,915 | 131.6 |
| Magnetic metal particles (b) | 7.3:1 | 1,938 | 130.5 |
| Magnetic metal particles (c) | 7.0:1 | 2,065 | 128.9 |
| Magnetic metal particles (d) | 6.8:1 | 1,896 | 130.8 |
| Magnetic metal particles (e) | 7.2:1 | 1,866 | 131.0 |
| Magnetic metal particles (f) | 7.8:1 | 1,662 | 138.0 |

TABLE 16-continued

| Kind of magnetic particles | Properties of magnetic acicular metal particles containing iron as main component Content of Al | | |
|---|---|---|---|
| | Central Portion (wt. %) | Surface portion (wt. %) | Surface coating layer (wt. %) |
| Magnetic metal particles (a) | 2.61 | 1.36 | 0.01 |
| Magnetic metal particles (b) | 1.32 | 2.84 | 0.01 |
| Magnetic metal particles (c) | 1.38 | 2.65 | 0.78 |
| Magnetic metal particles (d) | — | — | — |
| Magnetic metal particles (e) | — | — | — |
| Magnetic metal particles (f) | — | — | — |

| Kind of magnetic particles | Properties of magnetic acicular metal particles containing iron as main component | |
|---|---|---|
| | Content of Nd (wt %) | Resin adsorption (%) |
| Magnetic metal particles (a) | 0.01 | 72.5 |
| Magnetic metal particles (b) | 0.36 | 80.1 |
| Magnetic metal particles (c) | 2.78 | 83.6 |
| Magnetic metal particles (d) | — | — |
| Magnetic metal particles (e) | — | — |
| Magnetic metal particles (f) | — | — |

TABLE 17

Production of magnetic recording medium using magnetic acicular metal particles containing iron as a main component

| Examples | Kind of non-magnetic undercoat layer | Kind of magnetic acicular metal particles containing iron as a main component | Weight ratio of particles to resin (−) |
|---|---|---|---|
| Example 59 | Example 41 | Magnetic metal particles (e) | 5.0 |
| Example 60 | Example 42 | Magnetic metal particles (e) | 5.0 |
| Example 61 | Example 43 | Magnetic metal particles (e) | 5.0 |
| Example 62 | Example 44 | Magnetic metal particles (e) | 5.0 |
| Example 63 | Example 45 | Magnetic metal particles (e) | 5.0 |
| Example 64 | Example 46 | Magnetic metal particles (e) | 5.0 |
| Example 65 | Example 47 | Magnetic metal particles (e) | 5.0 |
| Example 66 | Example 48 | Magnetic metal particles (f) | 5.0 |
| Example 67 | Example 49 | Magnetic metal particles (f) | 5.0 |
| Example 68 | Example 50 | Magnetic metal particles (f) | 5.0 |
| Example 69 | Example 51 | Magnetic metal particles (f) | 5.0 |
| Example 70 | Example 52 | Magnetic metal particles (f) | 5.0 |
| Example 71 | Example 53 | Magnetic metal particles (f) | 5.0 |
| Example 72 | Example 54 | Magnetic metal particles (f) | 5.0 |
| Example 73 | Example 55 | Magnetic metal particles (f) | 5.0 |
| Example 74 | Example 56 | Magnetic metal particles (f) | 5.0 |
| Example 75 | Example 57 | Magnetic metal particles (f) | 5.0 |
| Example 76 | Example 58 | Magnetic metal particles (f) | 5.0 |

TABLE 17-continued

Properties of magnetic recording medium using magnetic acicular metal particles containing iron as a main component

| Examples | Thickness of magnetic layer (μm) | Coercive force (Hc) (Oe) | Br/Bm value (−) | Gloss (%) |
|---|---|---|---|---|
| Example 59 | 1.1 | 1,921 | 0.88 | 236 |
| Example 60 | 1.1 | 1,925 | 0.88 | 231 |
| Example 61 | 1.1 | 1,923 | 0.88 | 233 |
| Example 62 | 1.0 | 1,921 | 0.88 | 228 |
| Example 63 | 1.1 | 1,916 | 0.89 | 235 |
| Example 64 | 1.1 | 1,923 | 0.89 | 230 |
| Example 65 | 1.1 | 1,925 | 0.88 | 227 |
| Example 66 | 1.1 | 1,730 | 0.88 | 225 |
| Example 67 | 1.1 | 1,726 | 0.88 | 223 |
| Example 68 | 1.1 | 1,721 | 0.89 | 232 |
| Example 69 | 1.0 | 1,716 | 0.89 | 236 |
| Example 70 | 1.0 | 1,727 | 0.88 | 236 |
| Example 71 | 1.1 | 1,721 | 0.89 | 231 |
| Example 72 | 1.1 | 1,726 | 0.89 | 230 |
| Example 73 | 1.1 | 1,718 | 0.89 | 220 |
| Example 74 | 1.1 | 1,721 | 0.88 | 221 |
| Example 75. | 1.0 | 1,726 | 0.89 | 226 |
| Example 76 | 1.1 | 1,729 | 0.89 | 223 |

Properties of magnetic recording medium using magnetic acicular metal particles containing iron as a main component

| Examples | Surface roughness Ra (nm) | Young's modulus (relative value) | Durability Running durability (min) | Scratch resistance |
|---|---|---|---|---|
| Example 59 | 6.2 | 135 | 28.6 | A |
| Example 60 | 6.2 | 132 | 25.1 | B |
| Example 61 | 6.0 | 133 | 26.5 | B |
| Example 62 | 6.8 | 140 | 28.2 | A |
| Example 63 | 5.8 | 139 | 26.8 | B |
| Example 64 | 6.2 | 142 | 28.6 | A |
| Example 65 | 7.0 | 142 | ≧30 | A |
| Example 66 | 7.2 | 132 | 29.6 | A |
| Example 67 | 7.4 | 136 | 27.6 | A |
| Example 68 | 6.0 | 133 | 23.8 | B |
| Example 69 | 5.8 | 135 | 24.6 | B |
| Example 70 | 6.0 | 140 | 29.0 | A |
| Example 71 | 6.1 | 136 | 26.8 | A |
| Example 72 | 6.3 | 137 | ≧30 | A |
| Example 73 | 6.2 | 137 | ≧30 | A |
| Example 74 | 7.3 | 131 | 29.5 | A |
| Example 75 | 6.8 | 141 | ≧30 | A |
| Example 76 | 7.0 | 143 | ≧30 | A |

Properties of magnetic recording medium using magnetic acicular metal particles containing iron as a main component

| Examples | Linear absorption ($\mu m^{-1}$) | Corrosion resistance Percentage of change in coercive force (%) | Percentage of change in Bm (%) |
|---|---|---|---|
| Example 59 | 1.27 | 4.0 | 3.8 |
| Example 60 | 1.28 | 4.6 | 6.6 |
| Example 61 | 1.28 | 6.8 | 6.8 |
| Example 62 | 1.32 | 3.9 | 7.1 |
| Example 63 | 1.32 | 8.3 | 3.6 |
| Example 64 | 1.41 | 3.6 | 8.6 |
| Example 65 | 1.45 | 3.2 | 6.8 |
| Example 66 | 1.36 | 4.6 | 4.5 |
| Example 67 | 1.36 | 6.8 | 3.8 |
| Example 68 | 1.27 | 5.6 | 4.6 |

TABLE 17-continued

| Example 69 | 1.28 | 7.2 | 5.3 |
| --- | --- | --- | --- |
| Example 70 | 1.29 | 3.5 | 5.6 |
| Example 71 | 1.30 | 4.6 | 6.6 |
| Example 72 | 1.27 | 4.9 | 8.8 |
| Example 73 | 1.27 | 3.6 | 5.3 |
| Example 74 | 1.27 | 4.1 | 3.9 |
| Example 75 | 1.28 | 3.8 | 4.3 |
| Example 76 | 1.28 | 4.6 | 4.8 |

TABLE 18

Production of magnetic recording medium using magnetic acicular metal particles containing iron as a main component

| Comparative Examples | Kind of non-magnetic undercoat layer | Kind of magnetic acicular metal particles containing iron as a main component | Weight ratio of particles to resin (−) |
| --- | --- | --- | --- |
| Comparative Example 47 | Comparative Example 33 | Magnetic metal particles (e) | 5.0 |
| Comparative Example 48 | Comparative Example 34 | Magnetic metal particles (e) | 5.0 |
| Comparative Example 49 | Comparative Example 35 | Magnetic metal particles (e) | 5.0 |
| Comparative Example 50 | Comparative Example 36 | Magnetic metal particles (e) | 5.0 |
| Comparative Example 51 | Comparative Example 37 | Magnetic metal particles (e) | 5.0 |
| Comparative Example 52 | Comparative Example 38 | Magnetic metal particles (e) | 5.0 |
| Comparative Example 53 | Comparative Example 39 | Magnetic metal particles (e) | 5.0 |
| Comparative Example 54 | Comparative Example 40 | Magnetic metal particles (e) | 5.0 |
| Comparative Example 55 | Comparative Example 41 | Magnetic metal particles (e) | 5.0 |
| Comparative Example 56 | Comparative Example 42 | Magnetic metal particles (e) | 5.0 |
| Comparative Example 57 | Comparative Example 43 | Magnetic metal particles (e) | 5.0 |
| Comparative Example 58 | Comparative Example 44 | Magnetic metal particles (e) | 5.0 |
| Comparative Example 59 | Comparative Example 45 | Magnetic metal particles (e) | 5.0 |
| Comparative Example 60 | Comparative Example 46 | Magnetic metal particles (e) | 5.0 |

Properties of magnetic recording medium using magnetic acicular metal particles containing iron as a main component

| Comparative Examples | Thickness of magnetic layer (μm) | Coercive force (Hc) (Oe) | Br/Bm value (−) | Gloss (%) |
| --- | --- | --- | --- | --- |
| Comparative Example 47 | 1.3 | 1,880 | 0.82 | 149 |
| Comparative Example 48 | 1.1 | 1,878 | 0.81 | 123 |
| Comparative Example 49 | 1.2 | 1,896 | 0.83 | 158 |
| Comparative Example 50 | 1.2 | 1,899 | 0.83 | 160 |
| Comparative Example 51 | 1.2 | 1,900 | 0.83 | 173 |
| Comparative Example 52 | 1.2 | 1,886 | 0.85 | 181 |
| Comparative Example 53 | 1.3 | 1,908 | 0.85 | 183 |
| Comparative Example 54 | 1.2 | 1,892 | 0.84 | 193 |
| Comparative Example 55 | 1.2 | 1,896 | 0.85 | 195 |
| Comparative Example 56 | 1.1 | 1,890 | 0.85 | 180 |
| Comparative Example 57 | 1.3 | 1,892 | 0.84 | 176 |
| Comparative Example 58 | 1.2 | 1,896 | 0.84 | 169 |
| Comparative Example 59 | 1.1 | 1,898 | 0.85 | 147 |
| Comparative Example 60 | 1.3 | 1,908 | 0.86 | 173 |

Properties of magnetic recording medium using magnetic acicular metal particles containing iron as a main component

| Comparative Examples | Surface roughness Ra (nm) | Young's modulus (relative value) | Durability Running durability (min) | Scratch resistance |
| --- | --- | --- | --- | --- |
| Comparative Example 47 | 43.2 | 90 | 0.3 | D |
| Comparative Example 48 | 54.3 | 94 | 0.8 | D |
| Comparative Example 49 | 37.6 | 97 | 1.0 | D |
| Comparative Example 50 | 31.2 | 100 | 4.1 | D |
| Comparative Example 51 | 26.6 | 103 | 6.5 | D |
| Comparative Example 52 | 21.6 | 104 | 10.3 | C |
| Comparative Example 53 | 19.8 | 112 | 11.0 | C |
| Comparative Example 54 | 11.0 | 110 | 10.8 | C |
| Comparative Example 55 | 10.8 | 116 | 13.6 | C |
| Comparative Example 56 | 17.2 | 113 | 7.8 | D |
| Comparative Example 57 | 19.8 | 108 | 12.3 | C |
| Comparative Example 58 | 28.9 | 108 | 13.8 | C |
| Comparative Example 59 | 46.6 | 105 | 7.6 | D |
| Comparative Example 60 | 25.6 | 115 | 8.6 | C |

Properties of magnetic recording medium using magnetic acicular metal particles containing iron as a main component

| Comparative Examples | Linear absorption (μm$^{-1}$) | Corrosion resistance Percentage of change in coercive force (%) | Percentage of change in Bm (%) |
| --- | --- | --- | --- |
| Comparative Example 47 | 0.72 | 46.3 | 27.6 |
| Comparative Example 48 | 0.76 | 36.5 | 21.6 |
| Comparative Example 49 | 0.84 | 41.6 | 36.8 |
| Comparative Example 50 | 0.81 | 28.2 | 21.8 |
| Comparative Example 51 | 1.05 | 21.6 | 18.6 |
| Comparative Example 52 | 1.10 | 26.5 | 19.2 |
| Comparative Example 53 | 1.15 | 20.0 | 20.6 |
| Comparative Example 54 | 1.10 | 13.6 | 18.6 |

TABLE 18-continued

| | | | |
|---|---|---|---|
| Comparative Example 55 | 1.06 | 17.2 | 16.4 |
| Comparative Example 56 | 1.17 | 18.6 | 13.2 |
| Comparative Example 57 | 1.15 | 10.4 | 13.2 |
| Comparative Example 58 | 1.15 | 18.1 | 16.8 |
| Comparative Example 59 | 1.11 | 16.5 | 17.2 |
| Comparative Example 60 | 1.17 | 10.6 | 12.8 |

TABLE 19

Production of magnetic recording medium using magnetic acicular metal particles containing iron as a main component

| Examples | Kind of non-magnetic undercoat layer | Kind of magnetic acicular metal particles containing iron as a main component | Weight ratio of particles to resin (−) |
|---|---|---|---|
| Example 77 | Example 41 | Particles used in Example 4 | 5.0 |
| Example 78 | Example 42 | Magnetic metal particles (a) | 5.0 |
| Example 79 | Example 43 | Magnetic metal particles (a) | 5.0 |
| Example 80 | Example 44 | Magnetic metal particles (a) | 5.0 |
| Example 81 | Example 45 | Magnetic metal particles (a) | 5.0 |
| Example 82 | Example 46 | Particles used in Example 4 | 5.0 |
| Example 83 | Example 47 | Particles used in Example 4 | 5.0 |
| Example 84 | Example 48 | Magnetic metal particles (b) | 5.0 |
| Example 85 | Example 49 | Magnetic metal particles (b) | 5.0 |
| Example 86 | Example 50 | Magnetic metal particles (a) | 5.0 |
| Example 87 | Example 51 | Magnetic metal particles (b) | 5.0 |
| Example 88 | Example 52 | Magnetic metal particles (b) | 5.0 |
| Example 89 | Example 53 | Magnetic metal particles (c) | 5.0 |
| Example 90 | Example 54 | Magnetic metal particles (c) | 5.0 |
| Example 91 | Example 55 | Magnetic metal particles (c) | 5.0 |
| Example 92 | Example 56 | Magnetic metal particles (c) | 5.0 |
| Example 93 | Example 57 | Magnetic metal particles (c) | 5.0 |
| Example 94 | Example 58 | Magnetic metal particles (c) | 5.0 |

Properties of magnetic recording medium using magnetic acicular metal particles containing iron as a main component

| Examples | Thickness of magnetic layer (μm) | Coercive force (Hc) (Oe) | Br/Bm value (−) | Gloss (%) |
|---|---|---|---|---|
| Example 77 | 1.1 | 1,981 | 0.88 | 238 |
| Example 78 | 1.0 | 1,987 | 0.88 | 237 |
| Example 79 | 1.1 | 1,986 | 0.88 | 243 |
| Example 80 | 1.0 | 1,981 | 0.88 | 238 |
| Example 81 | 1.1 | 1,985 | 0.89 | 236 |
| Example 82 | 1.0 | 1,990 | 0.88 | 231 |
| Example 83 | 1.0 | 1,980 | 0.88 | 237 |
| Example 84 | 1.1 | 2,011 | 0.88 | 230 |
| Example 85 | 1.1 | 1,999 | 0.89 | 228 |
| Example 86 | 1.2 | 1,987 | 0.88 | 234 |
| Example 87 | 1.0 | 2,000 | 0.89 | 236 |
| Example 88 | 1.1 | 1,996 | 0.89 | 247 |
| Example 89 | 1.1 | 2,156 | 0.89 | 231 |
| Example 90 | 1.1 | 2,154 | 0.90 | 236 |
| Example 91 | 1.0 | 2,148 | 0.91 | 245 |
| Example 92 | 1.1 | 2,147 | 0.90 | 248 |
| Example 93 | 1.1 | 2,140 | 0.89 | 238 |
| Example 94 | 1.0 | 2,132 | 0.90 | 231 |

Properties of magnetic recording medium using magnetic acicular metal particles containing iron as a main component

| Examples | Surface roughness Ra (nm) | Young's modulus (relative value) | Running durability (min) | scratch resistance |
|---|---|---|---|---|
| Example 77 | 5.8 | 132 | ≧30 | A |
| Example 78 | 6.0 | 131 | 29.6 | A |
| Example 79 | 5.7 | 131 | 26.8 | A |
| Example 80 | 6.0 | 134 | 29.1 | A |
| Example 81 | 6.3 | 134 | 27.9 | A |
| Example 82 | 6.4 | 130 | ≧30 | A |
| Example 83 | 6.3 | 129 | ≧30 | A |
| Example 84 | 6.6 | 138 | ≧30 | A |
| Example 85 | 7.0 | 137 | ≧30 | A |
| Example 86 | 6.8 | 130 | ≧30 | A |
| Example 87 | 6.7 | 131 | ≧30 | A |
| Example 88 | 5.6 | 134 | ≧30 | A |
| Example 89 | 6.2 | 135 | ≧30 | A |
| Example 90 | 6.0 | 136 | ≧30 | A |
| Example 91 | 5.6 | 134 | ≧30 | A |
| Example 92 | 5.5 | 133 | ≧30 | A |
| Example 93 | 6.6 | 140 | ≧30 | A |
| Example 94 | 6.8 | 140 | ≧30 | A |

Properties of magnetic recording medium using magnetic acicular metal particles containing iron as a main component

| Examples | Linear absorption (μm$^{-1}$) | Corrosion resistance Percentage of change in coercive force (%) | Percentage of change in Bm (%) |
|---|---|---|---|
| Example 77 | 1.23 | 4.8 | 3.5 |
| Example 78 | 1.24 | 4.1 | 4.1 |
| Example 79 | 1.24 | 4.5 | 5.8 |
| Example 80 | 1.27 | 5.3 | 2.1 |
| Example 81 | 1.28 | 6.2 | 2.6 |
| Example 82 | 1.24 | 5.1 | 4.3 |
| Example 83 | 1.23 | 6.5 | 7.1 |
| Example 84 | 1.32 | 4.6 | 6.5 |
| Example 85 | 1.33 | 2.1 | 3.2 |
| Example 86 | 1.26 | 3.8 | 4.1 |
| Example 87 | 1.25 | 3.9 | 4.6 |
| Example 88 | 1.26 | 4.1 | 4.6 |
| Example 89 | 1.28 | 4.6 | 5.1 |
| Example 90 | 1.29 | 4.9 | 3.6 |
| Example 91 | 1.24 | 5.3 | 3.5 |
| Example 92 | 1.24 | 6.1 | 2.1 |
| Example 93 | 1.36 | 3.2 | 1.6 |
| Example 94 | 1.36 | 1.8 | 1.8 |

TABLE 20

Production of magnetic recording medium using magnetic acicular metal particles containing iron as a main component

| Comparative Examples | Kind of non-magnetic undercoat layer | Kind of magnetic acicular metal particles containing iron as a main component | Weight ratio of particles to resin (−) |
|---|---|---|---|
| Comparative Example 61 | Comparative Example 33 | Particles used in Example 4 | 5.0 |
| Comparative Example 62 | Comparative Example 34 | Magnetic metal particles (a) | 5.0 |

TABLE 20-continued

| Comparative Example | Comparative Example | | |
|---|---|---|---|
| Comparative Example 63 | Comparative Example 35 | Magnetic metal particles (a) | 5.0 |
| Comparative Example 64 | Comparative Example 36 | Magnetic metal particles (a) | 5.0 |
| Comparative Example 65 | Comparative Example 37 | Magnetic metal particles (a) | 5.0 |
| Comparative Example 66 | Comparative Example 38 | Magnetic metal particles (a) | 5.0 |
| Comparative Example 67 | Comparative Example 39 | Magnetic metal particles (a) | 5.0 |
| Comparative Example 68 | Comparative Example 40 | Magnetic metal particles (a) | 5.0 |
| Comparative Example 69 | Comparative Example 41 | Magnetic metal particles (a) | 5.0 |
| Comparative Example 70 | Comparative Example 42 | Magnetic metal particles (a) | 5.0 |
| Comparative Example 71 | Comparative Example 43 | Magnetic metal particles (d) | 5.0 |
| Comparative Example 72 | Comparative Example 44 | Magnetic metal particles (d) | 5.0 |
| Comparative Example 73 | Comparative Example 45 | Magnetic metal particles (d) | 5.0 |
| Comparative Example 74 | Comparative Example 46 | Magnetic metal particles (d) | 5.0 |

Properties of magnetic recording medium using magnetic acicular metal particles containing iron as a main component

| Comparative Examples | Thickness of magnetic layer (μm) | Coercive force (Hc) (Oe) | Br/Bm value (—) | Gloss (%) |
|---|---|---|---|---|
| Comparative Example 61 | 1.3 | 1,919 | 0.79 | 126 |
| Comparative Example 62 | 1.2 | 1,936 | 0.79 | 149 |
| Comparative Example 63 | 1.1 | 1,946 | 0.80 | 165 |
| Comparative Example 64 | 1.2 | 1,948 | 0.81 | 172 |
| Comparative Example 65 | 1.1 | 1,947 | 0.82 | 176 |
| Comparative Example 66 | 1.3 | 1,958 | 0.85 | 174 |
| Comparative Example 67 | 1.1 | 1,941 | 0.86 | 190 |
| Comparative Example 68 | 1.2 | 1,965 | 0.85 | 190 |
| Comparative Example 69 | 1.1 | 1,988 | 0.84 | 186 |
| Comparative Example 70 | 1.1 | 1,956 | 0.83 | 180 |
| Comparative Example 71 | 1.1 | 1,894 | 0.85 | 178 |
| Comparative Example 72 | 1.0 | 1,909 | 0.84 | 190 |
| Comparative Example 73 | 1.3 | 1,908 | 0.85 | 199 |
| Comparative Example 74 | 1.1 | 1,916 | 0.84 | 173 |

Properties of magnetic recording medium using magnetic acicular metal particles containing iron as a main component

| Comparative Examples | Surface roughness Ra (nm) | Young's modulus (relative value) | Durability Running durability (min) | Scratch resistance |
|---|---|---|---|---|
| Comparative Example 61 | 81.6 | 103 | 1.2 | D |
| Comparative Example 62 | 65.5 | 105 | 2.8 | D |
| Comparative Example 63 | 39.8 | 113 | 3.6 | D |
| Comparative Example 64 | 25.6 | 114 | 9.2 | D |
| Comparative Example 65 | 28.4 | 116 | 6.5 | D |
| Comparative Example 66 | 26.1 | 116 | 4.8 | D |
| Comparative Example 67 | 14.4 | 118 | 11.8 | C |
| Comparative Example 68 | 13.8 | 124 | 13.6 | C |
| Comparative Example 69 | 15.1 | 115 | 5.8 | D |
| Comparative Example 70 | 18.2 | 116 | 7.6 | D |
| Comparative Example 71 | 18.6 | 105 | 13.6 | C |
| Comparative Example 72 | 10.8 | 118 | 16.1 | C |
| Comparative Example 73 | 9.2 | 120 | 18.8 | C |
| Comparative Example 74 | 25.6 | 111 | 7.1 | D |

Properties of magnetic recording medium using magnetic acicular metal particles containing iron as a main component

| Comparative Examples | Linear absorption (μm$^{-1}$) | Corrosion resistance Percentage of change in coercive force (%) | Percentage of change in Bm (%) |
|---|---|---|---|
| Comparative Example 61 | 0.84 | 38.2 | 26.5 |
| Comparative Example 62 | 0.94 | 28.3 | 43.8 |
| Comparative Example 63 | 1.04 | 21.2 | 40.5 |
| Comparative Example 64 | 1.05 | 25.6 | 26.8 |
| Comparative Example 65 | 1.07 | 18.2 | 27.1 |
| Comparative Example 66 | 1.07 | 18.6 | 28.1 |
| Comparative Example 67 | 1.16 | 18.3 | 19.3 |
| Comparative Example 68 | 1.16 | 13.1 | 19.7 |
| Comparative Example 69 | 1.16 | 11.6 | 18.9 |
| Comparative Example 70 | 1.16 | 13.8 | 21.3 |
| Comparative Example 71 | 1.14 | 26.8 | 10.6 |
| Comparative Example 72 | 1.18 | 21.6 | 11.2 |
| Comparative Example 73 | 1.20 | 15.3 | 12.8 |
| Comparative Example 74 | 1.20 | 19.8 | 12.3 |

What is claimed is:

1. Acicular hematite particles containing zirconium of 0.05 to 30% by weight, calculated as Zr, based on the total weight of the particles, which is present within the particle, having an average major axis diameter of not more than 0.3 μm and a pH value of not less than 8, and containing not more than 300 ppm of soluble sodium salt, calculated as Na and not more than 150 ppm of soluble sulfate, calculated as $SO_4$.

2. Acicular hematite particles according to claim 1, which further have a coat formed on at least a part of the surface of said acicular hematite particle, comprising at least one compound selected from the group consisting of hydroxides of aluminum, oxides of aluminum, hydroxides of silicon and oxides of silicon in amount of 0.05 to 50% by weight, calculated as Al or $SiO_2$, based on the weight of said acicular hematite particles.

3. Acicular hematite particles according to claim 1, wherein the average major axis diameter thereof is 0.02 to 0.2 μm and the pH value thereof is 8.5 to 12.

4. Acicular hematite particles according to claim 3, which further have an aspect ratio (average major axis diameter/ average minor axis diameter) of 2:1 to 20:1 and an average minor axis diameter of 0.0025 to 0.15 μm.

5. Acicular hematite particles according to claim 1, which further have a BET specific surface area of 35 to 150 $m^2/g$ and a geometrical standard deviation of major axis diameter of not more than 1.50.

6. Acicular hematite particles according to claim 1, which further have a ratio value of a BET specific surface area $S_{BET}$ to a specific surface area $S_{TEM}$ of 0.5:1 to 2.5:1 (the specific surface area $S_{TEM}$ being calculated from the major axis diameter and the minor axis diameter which were measured from the particles in an electron micrograph of the acicular hematite particles).

7. Acicular hematite particles according to claim 1, which further have a resin adsorptivity of not less than 60%.

8. A magnetic recording medium comprising:

a non-magnetic base film;

a non-magnetic undercoat layer formed on said non-magnetic base film, comprising a binder resin and acicular hematite particles containing zirconium of 0.05 to 30% by weight, calculated as Zr, based on the total weight of the particles, which is present within the particle, having an average major axis diameter of not more than 0.3 μm and a pH value of not less than 8, and containing not more than 300 ppm of soluble sodium salt, calculated as Na and not more than 150 ppm of soluble sulfate, calculated as $SO_4$; and a magnetic coating film comprising a binder resin and magnetic acicular metal particles containing iron as a main component.

9. A magnetic recording medium according to claim 8, wherein said acicular hematite particles have a coat formed on at least a part of the surface of said acicular hematite particle, and comprising at least one compound selected from the group consisting of hydroxides of aluminum, oxides of aluminum, hydroxides of silicon and oxides of silicon in an amount of 5 to 50% by weight based on the total weight of the acicular hematite particles.

10. A magnetic recording medium according to claim 8, wherein the average major axis diameter thereof is 0.02 to 0.2 μm and the pH value thereof is 8.5 to 12.

11. A magnetic recording medium according to claim 8, wherein said acicular hematite particles have an aspect ratio (average major axis diameter/average minor axis diameter) of 2:1 to 20:1 and an average minor axis diameter of 0.0025 to 0.15 μm.

12. A magnetic recording medium according to claim 8, wherein said acicular hematite particles have a geometrical standard deviation of major axis diameter of not more than 1.50 and a BET specific surface area of 35 to 180 $m^2/g$.

13. A magnetic recording medium according to claim 8, wherein said magnetic acicular metal particles containing iron as a main component, contain aluminum of 0.05 to 10% by weight, calculated as Al, based on the total weight of the particles, which is present in, on or in and on the particle.

14. A magnetic recording medium according to claim 8, which further has a gloss of coating film of 200 to 300%, a surface roughness Ra of coating film of not more than 10.0 nm, and a linear absorption of coating film of 1.10 to 2.00 $\mu m^{-1}$.

15. A magnetic recording medium according to claim 8, which further has the change in the coercive force of not more than 10.0% and the change in the saturation magnetic flux density of not more than 10.0%.

16. A non-magnetic substrate comprising:

a non-magnetic base film; and a non-magnetic undercoat layer formed on said non-magnetic base film, comprising a binder resin and acicular hematite particles containing zirconium of 0.05 to 30% by weight, calculated as Zr, based on the total weight of the particles, which is present within the particle, having an average major axis diameter of not more than 0.3 μm and a pH value of not less than 8, and containing not more than 300 ppm of soluble sodium salt, calculated as Na and not more than 150 ppm of soluble sulfate, calculated as $SO_4$.

17. A non-magnetic substrate according to claim 16, wherein said acicular hematite particles have a coat formed on at least a part of the surface of said acicular hematite particle, and comprising at least one compound selected from the group consisting of hydroxides of aluminum, oxides of aluminum, hydroxides of silicon and oxides of silicon in an amount of 5 to 50% by weight based on the total weight of the acicular hematite particles.

* * * * *